United States Patent [19]

Pellet et al.

[11] Patent Number: 4,859,314

[45] Date of Patent: Aug. 22, 1989

[54] CATALYTIC CRACKING CATALYSTS AND CRACKING PROCESS USING NON-ZEOLITIC MOLECULAR SIEVES

[75] Inventors: Regis J. Pellet, Croton; Peter K. Coughlin, Yorktown Heights; Mark T. Staniulis, Peekskill; Gary N. Long, Putnam Valley; Jule A. Rabo, Armonk, all of N.Y.

[73] Assignee: UOP, Des Plaines, Ill.

[21] Appl. No.: 56,762

[22] Filed: Jun. 2, 1987

Related U.S. Application Data

[60] Continuation of Ser. No. 773,245, Sep. 6, 1985, abandoned, which is a continuation-in-part of Ser. No. 772,616, Sep. 4, 1985, which is a division of Ser. No. 675,285, Nov. 27, 1984, and a continuation-in-part of Ser. No. 490,952, May 2, 1983.

[51] Int. Cl.$^4$ .............................................. C10G 11/02
[52] U.S. Cl. ................................... 208/114; 208/120; 208/121; 208/122; 208/123; 208/124; 502/64; 502/208; 502/214
[58] Field of Search ............... 208/113, 114, 120, 119; 502/214

[56] References Cited

U.S. PATENT DOCUMENTS

| | | | |
|---|---|---|---|
| 3,240,697 | 3/1966 | Miale et al. | 585/640 |
| 4,310,440 | 1/1982 | Wilson et al. | 423/305 |
| 4,390,415 | 6/1983 | Myers | 208/120 |
| 4,440,871 | 4/1984 | Lok et al. | 208/114 |
| 4,499,327 | 2/1985 | Kaiser | 585/640 |
| 4,512,875 | 4/1985 | Long et al. | 208/114 |
| 4,551,236 | 11/1985 | Lok et al. | 200/114 |
| 4,567,029 | 1/1986 | Wilson et al. | 502/208 |
| 4,666,875 | 5/1987 | Pellet et al. | 502/65 |
| 4,734,185 | 3/1988 | Pellet et al. | 208/114 |
| 4,791,083 | 12/1988 | Pellet et al. | 502/64 |

FOREIGN PATENT DOCUMENTS 0059059  9/1982  European Pat. Off. ............. 502/64

*Primary Examiner*—Anthony McFarlane
*Attorney, Agent, or Firm*—Vincent J. Vasta, Jr.

[57] ABSTRACT

Catalytic cracking catalysts and their use in catalytic cracking processes are disclosed. The instant catalytic cracking catalysts are useful for cracking a hydrocarbon feedstock to produce lower boiling hydrocarbons. The catalysts comprise an effective amount of at least one non-zeolitic molecular sieve characterized in its calcined form by an adsorption of isobutane of at least 2 percent by weight at a partial pressure of 500 torr and a temperature of 20° C. The non-zeolitic molecular sieve is characterized as containing framework tetrahedral components of aluminum and phosphorus and at least one additional framework tetrahedral component, e.g., the non-zeolitic molecular sieve may be a silicoaluminophosphate as described in U.S. Pat. No. 4,440,871.

35 Claims, 3 Drawing Sheets

2

CATALYTIC CRACKING CATALYSTS AND CRACKING PROCESS USING NON-ZEOLITIC MOLECULAR SIEVES

This application is a continuation of U.S. Ser. No. 773,245, filed Sept. 6, 1985, abandoned, which in turn is a continuation-in-part application of U.S. Ser. No. 772,616, filed Sept. 4, 1985, which in turn is a divisional of prior U.S. Ser. No. 675,285, filed Nov. 27, 1984 and a continuation-in-part of U.S. Ser. No. 490,952, filed May 2, 1983.

FIELD OF THE INVENTION

The present invention relates to cracking catalysts derived from novel non-zeolitic molecular sieve compositions. The novel catalysts are employed in cracking processes to provide product mixtures substantially more valuable than products obtained by use of aeolite-based cracking catalysts.

BACKGROUND OF THE INVENTION

The prior art dealing with catalytic cracking catalysts has in large part evolved by the preparation of modified zeolites for use as components in cracking catalysts. The following patents are representative of the prior art dealing with zeolites and matrices.

The use of conversion catalysts formed from a zeolite dispersed in a siliceous matrix has been disclosed in U.S. Pat. Nos. 3,140,249 and 3,352,796.

The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalysts comprising a zeolite, an amorphous hydrous alumina and alumina monohydrate are disclosed in U.S. Pat. No. 3,428,550.

It has been disclosed that the steam and thermal stability of Y zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with $H_2O$ at a temperature ranging from about 800° to about 1500° F., and then subsequently cation exchange the steam and water treated zeolite with cations which may be rare earth metal cations. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 10 weight percent rare earth metal oxide. U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

The products obtained by use of such aforementioned catalysts may not be the most desirable in all instances. Accordingly, catalysts and processes have been developed to modify the products of cracking processes. Several patents have disclosed the use of various additives as components in cracking catalysts to modify product distributions. U.S. Pat. No. 4,284,529 discloses the use of a catalyst additive comprising a zeolite having an alpha value not less than about 5 and having substantially no activity for cracking n-hexane. U.S. Pat. No. 4,239,654 discloses a catalyst composition comprising an ultrastable Y-type crystalline aluminosilicate zeolite, a catalytic inorganic oxide matrix and a small pore crystalline ZSM-type zeolite. U.S. Pat. No. 4,289,606 is similar to U.S. Pat. No. 4,239,654 in that a small pore crystalline ZSM-5 type zeolite is employed with an ultrastable Y-type crystalline aluminosilicate zeolite as the catalyst. U.S. Pat. Nos. 4,309,279 and 4,309,280 relate to the use of a zeolite additive to cracking processes wherein the zeolite is characterized by a Constraint Index of about 1 to 12 and a silica to alumina ratio greater than about 12. The above processes relate to the use of zeolite mixtures and are necessarily limited to zeolites.

U.S. Pat. No. 4,440,871 discloses a novel class of crystalline microporous silicoaluminophosphate molecular sieves. These silicoaluminophosphates are generally disclosed as being useful for various hydrocarbon conversion processes, including catalytic cracking processes. The use of the silicoaluminophosphates of U.S. Pat. No. 4,440,871 as components in conventional cracking catalysts for the conversion of crude oil feedstocks containing carbon-hydrogen fragmentation compounds is disclosed in copending U.S. Ser. No. 490,952, filed May 2, 1983, now U.S. Pat. No. 4,512,875. Although the above generally disclose the use of the silicoaluminophosphates in cracking processes such do not disclose the use of specific silicoaluminophosphates to provide improved product distribution, as hereinafter discussed.

The use of silicoaluminophosphate molecular sieves as cracking catalysts is disclosed in copending U.S. Ser. No. 675,279, now U.S. Pat. No. 4,666,875, filed concurrently herewith and commonly assigned. The use of silicoaluminophosphates and zeolites as cracking catalysts is disclosed in copending U.S. Ser. No. 675,283 filed concurrently herewith and commonly assigned, now U.S. Ser. No. 935,599.

The instant invention relates to the use of non-zeolitic molecular sieves as components in cracking catalysts and to their use in catalytic cracking processes. When such non-zeolitic molecular sieves are added to cracking catalysts and employed in catalytic cracking processes such pocesses give products having product distributions substantially different and more valuable from that obtained in the absence of such non-zeolitic molecular sieves.

SUMMARY OF THE INVENTION

Figure 1:
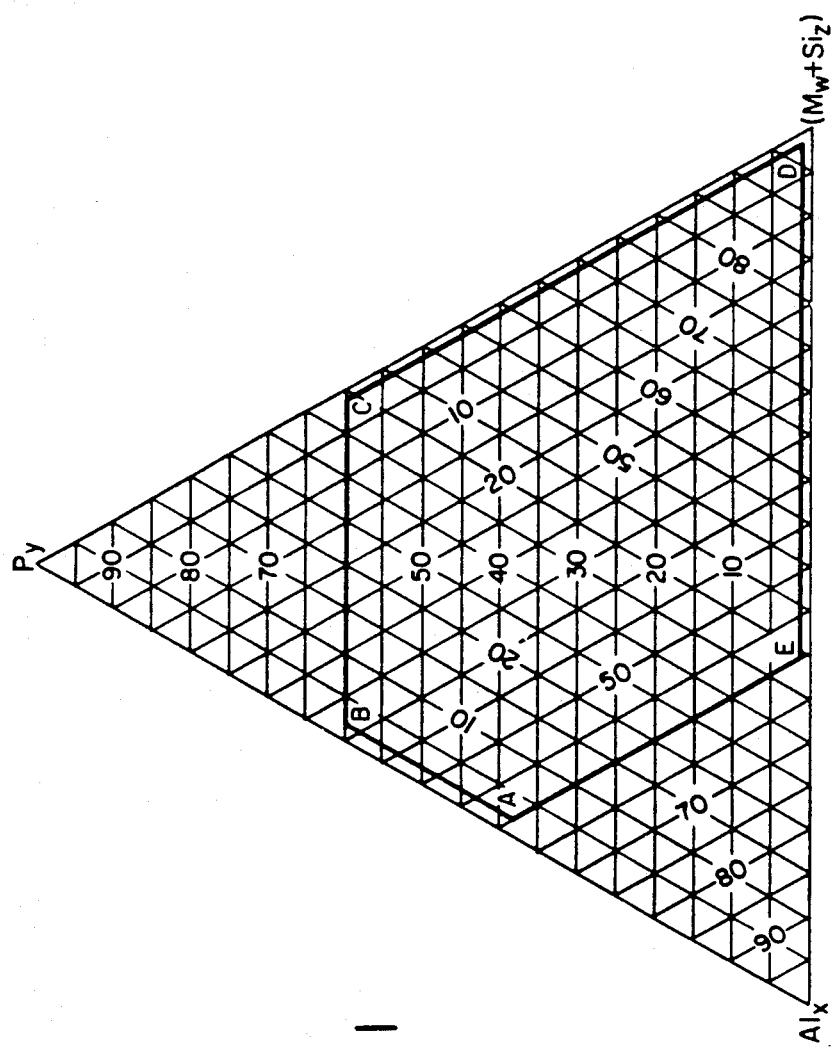
FIG. 1 is a ternary diagram wherein parameters relating to non-zeolitic molecular sieve compositions useful in the present invention are set forth as mole fractions. The compositions can be described by the acronym "ELAPSO" to designate crystalline molecular sieves having three-dimensional microporous framework structure of $ELO_2$, $AlO_2$, $PO_2$, and $SiO_2$ oxide units, where EL can be any one or more of As, Be, B, Cr, Co, Ga, Ge, Fe, Li, Mg, Mn, Ti, V and Zn.

The instant process relates to the catalytic cracking of crude oil feedstocks to produce lower boiling hydrocarbons and comprises contacting said feedstocks at effective catalytic cracking conditions with a catalyst comprising at least one non-zeolitic molecular sieve, as hereinafter described, and optionally particles having catalytic activity for cracking crude oil feedstocks at effective catalytic cracking conditions, e.g., particles containing a zeolitic aluminosilicate of the type generally employed in cracking catalysts. The non-zeolitic molecular sieves employed in this instant invention are characterized in their calcined form by an adsorption of isobutane of at least 2 percent by weight at a pressure of 500 torr and a temperature of 20° C. The cracking component, e.g., a zeolitic aluminosilicate, if any, is characterized as being a cracking component, such as heretofore traditionally employed in catalytic cracking process, e.g., the various forms of zeolite Y and silica-alumina components. The non-zeolitic molecular sieves employed in this invention are unique in that such are not zeolitic aluminosilicates, as heretofore employed in the prior art cracking catalysts, but are specific non-zeolitic molecular sieves.

DETAILED DESCRIPTION OF THE INVENTION

The present invention relates to new catalytic cracking catalysts, the process for their preparation and to the process of their use in catalytic cracking processes for the conversion of crude oil feedstocks. The catalytic cracking catalysts of the instant invention are derived from a novel class of non-zeolitic molecular sieves, as hereinafter discussed.

It has been found that the use of specific non-zeolitic molecular sieves provide different product distributions when such non-zeolitic molecular sieves are employed alone or in conjunction with conventional cracking catalysts having cracking activity at effective cracking conditions. Heretofore, the catalysts of the prior art have required that certain penalties be endured for the optimization of particular process variables or product characteristics, e.g., octane. For example, an improvement in gasoline octane of the products, as indicated by an increased ratio of branched to linear olefins and isoparaffin to normal paraffins, has been observed to occur with a concurrent decrease in gasoline yield and in feed conversion when zeolitic aluminosilicate-based catalysts are employed. As aforementioned, the presence of isoparaffins and branched olefins have long been employed as indications of higher octane products and their increase or decrease used as a relative indication of the octane of the gasoline product. The instant process provides for the improved production of isoparaffins and branched olefins and also provides a decrease in the relative amount of normal paraffins and linear olefins without significantly increasing the loss in gasoline yield and feed stock conversion.

The non-zeolitic molecular sieves employed in the instant invention are selected from the hereinafter described group of non-zeolitic molecular sieves as being characterized in their calcined form by an adsorption of isobutane of at least 2 percent by weight at a partial pressure of 500 torr and a temperature of 20° C. When the non-zeolitic molecular sieves are employed in conjunction with a zeolitic aluminosilicate cracking component the non-zeolitic molecular sieves are preferably also characterized in their calcined form by an adsorption of triethylamine of less than 5 percent by weight at a partial pressure of 2.6 torr and a temperature of 22° C. In a further embodiment the non-zeolitic molecular sieves are employed without a zeolitic aluminosilicate and in such embodiment the non-zeolitic molecular sieves are preferably characterized by an adsorption of triethylamine greater than 5 percent by weight at a partial pressure of 2.6 torr and a temperature of 22° C.

NON-ZEOLITIC MOLECULAR SIEVES ("NZ-MS")

The term "non-zeolitic molecular sieves" or "NZ-MS" is defined in the instant invention to include the "SAPO" molecular sieves of U.S. Pat. No. 4,440,871, "ELAPSO" molecular sieves as disclosed in U.S. Ser. No. 600,312, filed Apr. 13, 1984, now U.S. Pat. No. 4,793,984, and certain "MeAPO", "FeAPO", "TiAPO" and "FCAPO" molecular sieves. Crystalline metal aluminophospates (MeAPOs where "Me" is at least one of Mg, Mn, Co and Zn) are disclosed in U.S. Ser. No. 514,334, filed July 15, 1983 now U.S. Pat. No. 4,567,029; crystalline ferroaluminophosphates (FeAPOs) are disclosed in U.S. Ser. No. 514,335, filed July 15, 1983 now U.S. Pat. No. 4,554,143; titanium aluminophosphates (TAPOs) are disclosed in U.S. Ser. No. 480,738, now U.S. Pat. No. 4,500,651; and non-zeolitic molecular sieves ("FCAPO") are disclosed in U.S. Ser. No. 600,171, filed Apr. 13, 1984 now U.S. Pat. No. 4,686,093. The aforementioned copending applications are incorporated herein by reference thereto.

"ELAPSO" molecular sieves are described in co-pending U.S. Ser. No. 600,312, filed Apr. 13, 1984, as crystalline molecular sieves having three-dimensional microporous framework structures of $ELO_2$, $AlO_2$, $PO_2$, $SiO_2$ oxide units and having an empirical chemical composition on an anhydrous basis expressed by the formula:

$$mR:(EL_wAl_xP_ySi_hd z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a three dimensional oxide framework, "EL" is characterized as an element having a mean "T—O" distance in tetrahedral oxide structures between about 1.51 Angstroms and about 2.06 Angstroms, "EL" has a cation electronegativity between about 125 kcal/g-atom to about 310 kcal/gm-atom and "EL" is capable of forming stable M—O—P, M—O—Al or M—O—M bonds in crystalline three dimensional oxide structures having a "M—O" bond dissociation energy greater than about 59 kcal/g-atom at 298° K.; and "w", "x", "y" and "z" represent the mole fractions of "EL", aluminum, phosphorus and silicon, respectively, present as framework oxides said mole fractions being within the limiting compositional values or points of FIG. 1 as follows:

| Point | Mole Fraction | | |
|---|---|---|---|
| | x | y | (z + w) |
| A | 0.60 | 0.39-(0.01)p | 0.01(p + 1) |
| B | 0.39-(0.01p) | 0.60 | 0.01(p + 1) |
| C | 0.01 | 0.60 | 0.39 |
| D | 0.01 | 0.01 | 0.98 |
| E | 0.60 | 0.01 | 0.39 | where "p" is an integer corresponding to the number of elements "El" in the $(El_wAl_xP_ySi_z)O_2$ constituent.

The "ELAPSO" molecular sieves are also described as crystalline molecular sieves having three-dimensional microporous framework structures of $ElO_2$, $AlO_2$, $SiO_2$ and $PO_2$ tetrahedral oxide units and having an empirical chemical composition on an anhydrous basis expressed by the formula:

$$mR:(El_wAl_xP_ySi_z)O_2$$

wherein "R" represents at least one organic templating agent present in the intracrystalline pore system; "m" represents the molar amount of "R" present per mole of $(El_wAl_xP_ySi_z)O_2$ and has a value of from zero to about 0.3; "EL" represents at least one element capable of forming a framework tetrahedral oxide and is selected from the group consisting of arsenic, beryllium, boron, chromium, cobalt, gallium, germanium, iron, lithium, magnesium, manganese, titanium, vanadium and zinc; and "w", "x", "y" and "z" represent the mole fractions of "EL", aluminum, phosphorus and silicon, respectively, present as tetrahedral oxides said mole fractions being within the limiting compositional values or points as follows:

| Point | Mole Fraction | | |
|---|---|---|---|
| | x | y | (z + w) |
| a | 0.60 | 0.39-(0.01)p | 0.01(p + 1) |
| b | 0.39-(0.01p) | 0.60 | 0.01(p + 1) |
| c | 0.10 | 0.55 | 0.35 |
| d | 0.55 | 0.10 | 0.35 | where "p" is as above defined.

In synthesizing the ELAPSO compositions of the instant invention, it is preferred to employ a reaction mixture composition expressed in terms of molar ratios as follows:

$$aR:(EL_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; "EL" represents at least one element, as hereinbefore described, capable of forming a framework oxide unit, $ELO_2^n$, with $SiO_2$, $AlO_2^-$ and $PO_2^+$ tetrahedral oxide units; "n" has a value of $-3$, $-2$, $-1$, 0 or $+1$; and "w", "x", "y", "z" represent the mole fractions of elements "EL", aluminum phosphorus, and silicon respectively, and each has a value of at least 0.01. In a preferred embodiment the reaction mixture is selected such that the mole fractions "w", "x", "y", and "z" are generally defined as being within the pentagonal compositional area defined by points E, F, G, H, and I of FIG. 3. Points E, F, G, H, and I of FIG. 3 have the following values of "w", "x", "y", and "z":

| Point | Mole Fraction | | |
|---|---|---|---|
| | x | y | (z + w) |
| F | 0.60 | 0.38 | 0.02 |
| G | 0.38 | 0.60 | 0.02 |
| H | 0.010 | 0.60 | 0.39 |
| I | 0.010 | 0.01 | 0.98 |
| J | 0.60 | 0.01 | 0.39 |

In the foregoing expression of the reaction composition, the reactants are normalized with respect to the total of "w", "x", "y", and "z" such that $(w+x+y+z)=1.00$ mole, whereas in the examples the reaction mixtures may be expressed in terms of molar oxide ratios normalized to the moles of $P_2O_5$. This latter form is readily converted to the former form by routine calculations by dividing the number of moles of each component (including the template and water) by the total number of moles of elements "EL", aluminum, phosphorus and silicon which results in normalized mole fractions based on total moles of the aforementioned components.

The "ELAPSO" molecular sieves include numerous species which are intended herein to be within the scope disclosed in the following copending and commonly assigned applications, incorporated herein by reference thereto. The letter (A) following a serial number indicates that the application is abandoned, while (CIP) following a serial number indicates that the application is a continuation-in-part of the immediately preceding application and (c) indicates that the application is a continuation of the immediately preceding application:

| U.S. Serial No. | Filed | NZMS | U.S. Pat. No. |
|---|---|---|---|
| 599,808(A) | April 13, 1984 | AsAPSO | |
| 845,484(CIP) | March 31, 1986 | AsAPSO | |
| 600,177(A) | April 13, 1984 | BAPSO | |
| 845,255(CIP) | March 28, 1986 | BAPSO | |
| 600,276(A) | April 13, 1984 | BeAPSO | |
| 841,752(CIP) | March 20, 1986 | BeAPSO | 4,737,353 |
| 599,830(A) | April 13, 1984 | CAPSO | |
| 852,174(CIP) | April 15, 1986 | CAPSO | 4,738,837 |
| 599,925(A) | April 13, 1984 | GaAPSO | |
| 845,985(CIP) | March 31, 1986 | GaAPSO | 4,684,617 |
| 599,971(A) | April 13, 1984 | GeAPSO | |
| 852,175(CIP) | April 15, 1986 | GeAPSO | |
| 599,952(A) | April 13, 1984 | LiAPSO | |
| 847,227(CIP) | April 2, 1986 | LiAPSO | |
| 600,179 | April 13, 1984 | TiAPSO | 4,684,617 |
| 49,274(C) | May 13, 1987 | TiAPSO | |
| 600,180 | April 13, 1984 | MgAPSO | 4,758,419 |
| 600,175 | April 13, 1984 | MnAPSO | 4,686,092 |
| 600,174 | April 13, 1984 | CoAPSO | 4,744,970 |
| 600,170 | April 13, 1984 | ZnAPSO | |
| 600,173 | April 13, 1984 | FeAPSO | 4,683,217 |
| 600,168(A) | April 13, 1984 | QuinAPSO | |
| 63,792(C) | June 22, 1987 | QuinAPSO | |
| 600,181 | April 13, 1984 | QuinAPSO | 4,741,902 |
| 600,182 | April 13, 1984 | CoMnMgAPSO | |
| 57,648(C) | June 9, 1987 | CoMnMgAPSO | |
| 600,183 | April 13, 1984 | SenAPSO | |

The disclosures of the patents listed in the foregoing table are herein incorporated by reference.

TiAPSO Molecular Sieves

The TiAPSO molecular sieves of U.S. Ser. No. 600,179, filed Apr. 13, 1984 now U.S. Pat. No. 4,500,651 have three-dimensional microporous framework structures of $TiO_2$, $AlO_2$, $PO_2$ and $SiO_2$ tetrahedral oxide units having an empirical chemical composition on an anhydrous basis expressed by the formula:

$$mR:(Ti_wAl_xP_ySi_z)O_2$$

wherein "R" represents at least one organic templating agent present in the intracrystalline pore system; "m" represents the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined being within the limiting compositional values or points of FIG. 1 as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of TiAPSO molecular sieves the values "w", "x", "y" and "z" in the above formula are within the limiting compositional values or points of FIG. 2 as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

TiAPSO compositions are generally synthesized by hydrothermal crystallization from a reaction mixture containing active resources of titanium, silicon, aluminum and phosphorus, and preferably an organic templating, i.e., structure-directing, agent, preferably a compound of an element of Group VA of the Periodic Table, and/or optionally an alkali or metal metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the TiAPSO product are obtained, usually a period of from hours to several weeks. Generally, the crystallization time is from about 2 hours to about 30 days and typically from about 4 hours to about 20 days. The product is recovered by any convenient method such as centrifugation or filtration.

In synthesizing the TiAPSO, it is preferred to employ a reaction mixture composition expressed in terms of the molar ratios as follows:

$$aR:(Ti_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of titanium, aluminum, phosphorus and silicon, respectively, and each has a value of at least 0.01.

Figure 3:
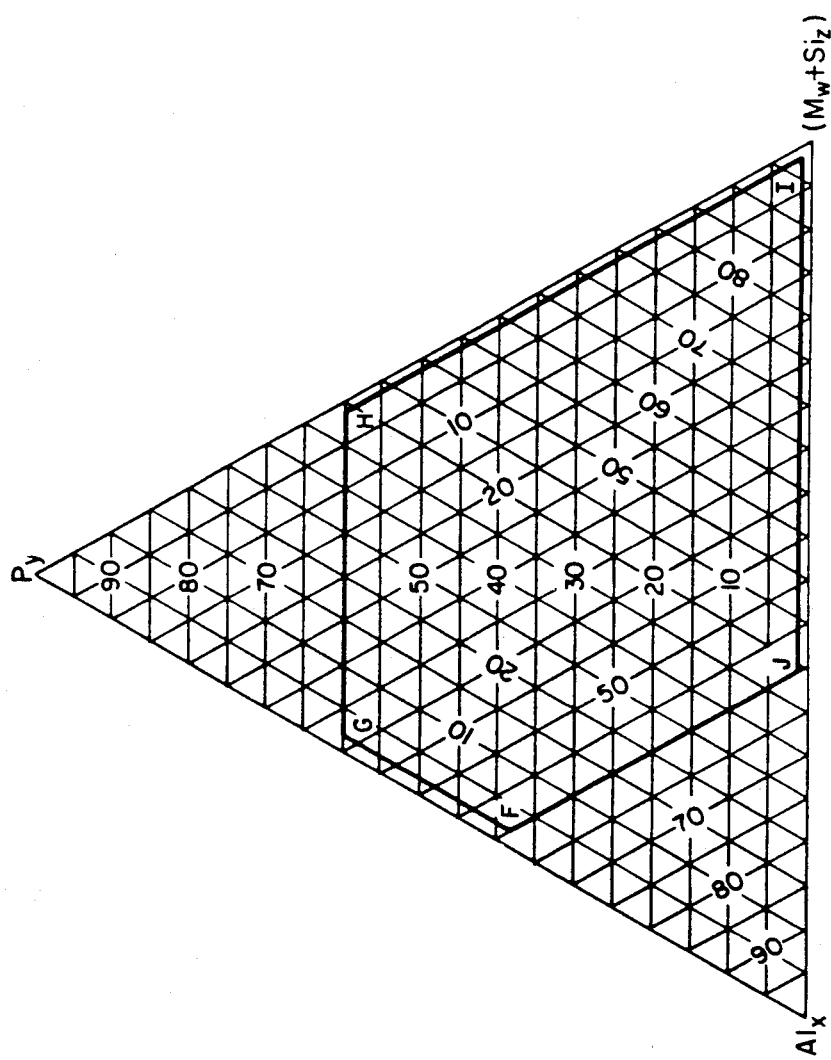
FIG. 3 is a ternary diagram wherein parameters relating to the reaction mixtures employed in the preparation of the ELAPSO compositions useful in this invention are set forth as mole fractions.

In a preferred embodiment the reaction mixture is selected such that the mole fractions "w", "x", "y" and "z" are generally defined as being within the limiting compositional values or points of FIG. 3 as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that (w+x+y+z)=1.00 mole. Molecular sieves containing titanium, aluminum, phosphorus and silicon as framework tetrahedral oxides are prepared as follows:

Preparative Reagents

TiAPSO compositions were prepared using numerous regents. The reagents employed and abbreviations employed herein, if any, for such reagents are as follows:
(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent aqueous phosphoric acid;
(d) Tiipro: titanium isopropoxide;
(e) TEAOH: 40 weight percent aqueous solution of tetraethylammonium hydroxide;
(f) $Pr_2NH$: di-n-propylamine, $(C_3H_7)_2NH$.
(g) $Pr_2NH$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$; and
(j) C-hex: cyclohexylamine.

Preparative Procedures Preparative examples were carried out by forming a starting reaction mixture by adding the $H_3PO_4$ and the water. This mixture was mixed and to this mixture the aluminum isoproxide was added. This mixture was then blended until a homogeneous mixture was observed. To this mixture the LUDOX-LS was added and the resulting mixture blended (about 2 minutes) until a homogeneous mixture was observed.

The titanium isopropoxide was added to the above mixture and the resulting mixture blended until a homogeneous mixture was observed. The organic templating agent was then added to the resulting mixture and the resulting mixture blended until a homogeneous mixture was observed, i.e., about 2 to 4 minutes. When the organic templating agent was quinuclidine the procedure was modified such that the quinuclidine was dissolved in about one half the water and accordingly the $H_3PO_4$ was mixed with about one half the water. (The pH of the mixture was measured and adjusted for temperature). The mixture was than placed in a lined (polytetrafluoroethylene) stainless steel pressure vessel and digested at a temperature (150° C. or 200° C.) for a time or placed in lined screw top bottles for digestion at 100° C. All digestions were carried out at the autogenous pressure.

All digestions were carried out at the autogenous pressure. The products were removed from the reaction vessel cooled and evaluated as set forth hereinafter.

MgAPSO Molecular Sieves

The MgAPSO molecular sieves of U.S. Ser. No. 600,180, filed Apr. 13, 1984 now U.S. Pat. No. 4,658,419 have three-dimensional microporous framework structures of $MgO_2^{-2}$, $AlO_2^{-}$, $PO_2^{+}$ and $SiO_2$ tetrahedral oxide units and have an empirical chemical composition on an anhydrous basis expressed by the formula:

$$mR:(Mg_wAl_xP_ySi_z)O_2$$

wherein "R" represents at least one organic templating agent present in the intracrystalline pore system; "m" represents the molar amount of "R" present per mole of $(Mg_wAl_xP_ySi_z)O_2$ and has a value from zero (0) to about 0.3; and "w", "x", "y" and "z" represent the mole fractions of magnesium, aluminum, phosphorus and silicon, respectively, present as tetrahedral oxides and each preferably has a value of at least 0.01. The mole fractions "w", "x", "y" and "z" are generally defined as being within the limiting compositional values or points in FIG. 1 as follows:

| Point | Mole Fraction | | |
|-------|------|------|---------|
|       | x    | y    | (z + w) |
| A     | 0.60 | 0.38 | 0.02    |
| B     | 0.39 | 0.59 | 0.02    |
| C     | 0.01 | 0.60 | 0.39    |
| D     | 0.01 | 0.01 | 0.98    |
| E     | 0.60 | 0.01 | 0.39    |

In a preferred subclass of the MgAPSO molecular sieves the values "w", "x", "y" and "z" in the above formula are within the limiting compositional values or points of FIG. 2 as follows:

| Point | Mole Fraction | | |
|-------|------|------|---------|
|       | x    | y    | (z + w) |
| a     | 0.55 | 0.43 | 0.02    |
| b     | 0.43 | 0.55 | 0.02    |
| c     | 0.10 | 0.55 | 0.35    |
| d     | 0.55 | 0.10 | 0.35    |

MgAPSO compositions are generally synthesized by hydrothermal crystallization for an effective time at effective pressures and temperatures from a reaction mixture containing reactive sources of magnesium, silicon, aluminum and phosphorus, an organic templating, i.e., structure-directing, agent, preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the MgAPSO product are obtained, usually a period of from several hours to several weeks. Generally, the crystallization period will be from about 2 hours to about 30 days with it typically being from about 4 hours to about 20 days for obtaining MgAPSO crystals. The product is recovered by any convenient method such as centrifugation or filtration.

In synthesizing the MgAPSO compositions, it is preferred to employ reaction mixture compositions expressed in terms of the molar ratios as follows:

$$aR:(Mg_wAl_xP_ySi_z)O_2:bH_2O$$

wherein "R" is an organic templating agent; "a" is the amount of organic templating agent "R" and can have a value within the range of from zero (0) to about 6 and is more preferably an effective amount greater than zero to about 6; "b" has a value of from zero (0) to about 500, preferably between about 2 and about 300; and "w", "x", "y" and "z" represent the mole fractions of magnesium, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points of FIG. 3 as follows:

| Point | Mole Fraction | | |
|-------|------|------|---------|
|       | x    | y    | (z + w) |
| F     | 0.60 | 0.38 | 0.02    |
| G     | 0.38 | 0.60 | 0.02    |
| H     | 0.01 | 0.60 | 0.39    |
| I     | 0.01 | 0.01 | 0.98    |
| J     | 0.60 | 0.01 | 0.39    |

In the foregoing expression of the reaction composition, the reactants are normalized with respect to the total of "w", "x", "y" and "z" such that (w+x+y+z)=1.00 mole. Molecular sieves containing magnesium, aluminum, phosphorus and silicon as framework tetrahedral oxides are prepared as follows:

Preparative Reagents

MgAPSO compositions were prepared using numerous regents. The reagents employed and abbreviations employed herein, if any, for such reagents are as follows:

(a) Alipro: aluminum isopropoxide;
(b) CATAPAL: Trademark of Condea for hydrated pseudo-boehmite;
(c) LUDOX-LS: Trademark of DuPont for an aqueous solution of 30 weight percent $SiO_2$ and 0.1 weight percent $Na_2O$;
(d) Mg(Ac)$_2$: magnesium acetate tetrahydrate, $Mg(C_2H_3O_2)_2 \cdot 4H_2O$;
(e) $H_3PO_4$: 85 weight percent aqueous phosphoric acid in water;
(f) TBAOH: tetraethylammonium hydroxide (40 wt. % in water);
(g) Pr$_2$NH: di-n-propylamine,
(h) Pr$_3$NH: tri-n-propylamie;
(i) Quin: Quinuclidine;
(j) MQuin: Methyl Quinuclidine hydroxide, (17.9% in water);
(k) C-hex: cyclohexylamine.
(l) TEAOH: tetraethylammonium hydroxide (40 wt. % in water).
(m) DEEA: Diethylethanolamine;
(n) i-Pr$_2$NH: di-isopropylamine;
(o) TEABr: tetraethylammonium bromide; and (p) TPAOH: tetrapropylammonium hydroxide (40 wt. % in water).

Preparative Procedures

The MgAPSO compositions were prepared by preparing reaction mixtures having a molar composition expressed as:

eR:fMgO:hAl$_2$O$_3$:iP$_2$O$_5$:gSiO$_2$:jH$_2$O wherein e, f, g, h, i and j represent the moles of template R, magnesium (expressed as the oxide), SiO$_2$, Al$_2$O$_3$, P$_2$O$_5$(H$_3$PO$_4$ expressed as P$_2$O$_5$) and H$_2$O, respectively.

The reaction mixtures were prepared by three procedures, designated hereinafter as Methods A, B and C.

Method A

The reaction mixture was prepared by mixing the ground aluminum source (Alipro or CATAPAL) with the H$_3$PO$_4$ and water on a gradual basis with occasional cooling with an ice bath. The resulting mixture was blended until a homogeneous mixture was observed. When the aluminum source was CATAPAL the water and H$_3$PO$_4$ were first mixed with the CATAPAL added thereto. The magnesium acetate was dissolved in a portion of the water and was then added followed by addition of the LUDOX-LS. The combined mixture was blended until a homogenous mixture was observed. The organic templating agent was added to this mixture and blended until a homogenous mixture was observed. The resulting mixture (final reaction mixture) was placed in a lined (polytetrafluoroethylene) stainless steel pressure vessel and digested at a temperature (150° C. or 200° C.) for an effective time. Alternatively, if the digestion temperature was 100° C. the final reaction mixture was placed in a lined (polytetrafluoroethylene) screw top bottle for a time. All digestions were carried out at the autogenous pressure. The products were removed from the reaction vessel cooled and evaluated as set forth hereinafter. Molecular sieves containing manganese, aluminum, phosphorus and silicon as framework tetrahedral oxide units are prepared as follows:

Preparative Reagents

MnAPSO compositions were prepared using numerous reagents. The reagents employed and abbreviations employed herein, if any, for such reagents are as follows:

(a) Alipro: aluminum isopropoxide;
(b) CATAPAL; Trademark of Condea Corporation for hydrated pseudoboehmite;
(c) LUDOX-LS: LUDOX-LS is the tradename of DuPont for an aqueous solution of 30 weight percent SiO$_2$ and 0.1 weight percent Na$_2$O;
(d) H$_3$PO$_4$: 85 weight percent aqueous phosphoric acid;
(e) MnAc: Manganese acetate, Mn(C$_2$H$_3$O$_2$)$_2$.4H$_2$O;
(f) TEAOH: 40 weight percent aqueous solution of tetraethylammonium hydroxide;
(g) TBAOH: 40 weight percent aqueous solution of tetrabutylammonium hydroxide;
(h) Pr$_2$NH: di-n-propylamine, (C$_3$H$_7$)$_2$NH;
(i) Pr$_3$N: tri-n-propylamine (C$_3$H$_7$)$_3$N;
(j) Quin: Quinuclidine, (C$_7$H$_{13}$N);
(k) MQuin: Methyl Quinuclidine hydroxide, (C$_7$H$_{13}$NCH$_3$OH);
(l) C-hex: cyclohexylamine;
(m) TMAOH: tetramethylammonium hydroxide;
(n) TPAOH: tetrapropylammonium hydroxide; and
(o) DEEA: 2-diethylaminoethanol.

Preparative Procedures

Preparative examples were carried out by forming a starting reaction mixture by adding the H$_3$PO$_4$ to one half of the quantity of water. This mixture was mixed and to this mixture the aluminum isopropoxide or CATAPAL was added. This mixture was then blended until a homogeneous mixture was observed. To this mixture the LUDOX LS was added and the resulting mixture blended (about 2 minutes) until a homogeneous mixture was observed. A second mixture was prepared using the manganese acetate and the remainder (about 50%) of the water. The two mixtures were admixed and the resulting mixture blended until a homogeneous mixture was observed. The organic templating agent was then added to the resulting mixture and the resulting mixture blended until a homogeneous mixture was observed, i.e., about 2 to 4 minutes. (The pH of the mixture was measured and adjusted for temperature). The mixture was then placed in a lined (polytetrafluoroethylene) stainless steel pressure vessel and digested at a temperature (150° C. or 200° C.) for a time or placed in lined screw top bottles for digestion at 100° C. All digestions were carried out at the autogenous pressure.

CoAPSO Molecular Sieves

The CoAPSO molecular sieves of U.S. Ser. No. 600,174, filed Apr. 13, 1984 now U.S. Pat. No. 4,744,970 have three-dimensional microporous framework structures of CoO$_2^{-2}$, AlO$_2^-$, PO$_2^+$ and SiO$_2$ tetrahedral units and have an empirical chemical composition on an anhydrous basis expressed by the formula:

mR:(Co$_w$Al$_x$P$_y$Si$_z$)O$_2$ wherein "R" represents at least one organic templating agent present in the intracrystalline pore system; "m" represents the molar amount of "R" present per mole of (Co$_w$Al$_x$P$_y$Si$_z$)O$_2$ and has a value of from zero to about 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the limiting compositional values or points in FIG. 1 as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CoAPSO molecular sieves the values of "w", "x", "y", and "z" in the above formula are within the limiting compositional values or points in FIG. 2 as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |

| | Mole Fraction | | |
|---|---|---|---|
| Point | x | y | (z + w) |
| d | 0.55 | 0.10 | 0.35 |

CoAPSO compositions are generally synthesized by hydrothermal crystallization from a reaction mixture containing reactive sources of cobalt, silicon, aluminum and phosphorus, an organic templating, i.e., structure-directing, agent, preferably a compound of an element of Group VA of the Periodic Table, and optionally an alkali metal. The reaction mixture is generally placed in a sealed pressure vessel, preferably lined with an inert plastic material such as polytetrafluoroethylene and heated, preferably under autogenous pressure at an effective temperature which is generally between 50° C. and 250° C. and preferably between 100° C. and 200° C. until crystals of the CoAPSO product are obtained, usually for an effective time of from several hours to several weeks. Generally the effective crystallization time will be from about 2 hours to about 30 days and typically from about 4 hours to about 20 days. The product is recovered by any convenient method such as centrifugation or filtration.

In synthesizing the CoAPSO, it is preferred to employ a reaction mixture composition expressed in terms of the molar ratios as follows:

$$aR:(Co_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; and "w", "x", "y" and "z" represent the mole fractions of cobalt, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points in FIG. 3 as follows:

| | Mole Fraction | | |
|---|---|---|---|
| Point | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

For reasons unknown at present, not every reaction mixture gave crystalline CoAPSO products when reaction products were examined for CoAPSO products by X-ray analysis. Those reaction mixtures from which crystalline CoAPSO products were obtained are reported in the examples hereinafter as numbered examples and those reaction mixtures from which CoAPSO products were not identified by use of X-ray analysis are reported as lettered examples.

In the foregoing expression of the reaction composition, the reactants are normalized with respect to the total of "w", "x", "y" and "z" such that (w+x+y+z)=1.00 mole. Molecular sieves containing cobalt, aluminum, phosphorus and silicon as framework tetrahedral oxide units are prepared as follows:

Preparative Reagents

CoAPSO compositions were prepared using numerous reagents. The reagents employed and abbreviations employed herein, if any, for such reagents are as follows:
(a) Alipro: aluminum isoproproxide;
(b) CATAPAL: Trademark of Condea Corporation for pseudoboehmite;
(c) LUDOX-LS: Trademark of DuPont for an aqueous solution of 30 weight percent $SiO_2$ and 0.1 weight percent $Na_2O$;
(d) $Co(Ac)_2$: cobalt acetate $Co(C_2H_3O_2)_2 \cdot 4H_2O$;
(e) $CoSO_4$: cobalt sulfate ($CoSO_4 \cdot 7H_2O$);
(f) $H_3PO_4$: 85 weight percent phosphoric acid in water;
(g) TBAOH: tetrabutylammonium hydroxide (25 wt % in methanol);
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine $(C_7H_{13}N)$;
(k) MQuin: Methyl Quinuclidine hydroxide, $(C_7H_{13}NCH_3OH)$;
(l) C-hex; cyclohexylamine;
(m) TEAOH; tetraethylammonium hydroxide (40 wt. % in water);
(n) DEEA: diethanolamine;
(o) TPAOH: tetrapropylammonium hydroxide (40 wt. % in water); and
(p) TMAOH: tetramethylammonium hydroxide (40 wt. % in water).

Preparative Procedure

The CoAPSO compositions were prepared by preparing reaction mixtures having a molar composition expressed as:

$$eR:fCoO:hAl_2O_3:iP_2O_5:gSiO_2:jH_2O$$

wherein e, f, h, i, g and j represent the moles of template R, cobalt (expressed as the oxide), $Al_2O_3$, $P_2O_5$ ($H_3PO_4$ expressed as $P_2O_5$), $SiO_2$ and $H_2O$, respectively.

The reaction mixtures were prepared by forming a starting reaction mixture comprising the $H_3PO_4$ and one half of the water. This mixture was stirred and the aluminum source (Alipro or CATAPAL) added. The resulting mixture was blended until a homogeneous mixture was observed. The LUDOX-LS was then added to the resulting mixture and the new mixture blended until a homogeneous mixture was observed. The cobalt source ($Co(Ac)_2$, $Co(SO_4)$ or mixtures thereof) was dissolved in the remaining water and combined with the first mixture. The combined mixture was blended until a homogeneous mixture was observed. The organic templating agent was added to this mixture and blended for about two to four minutes until a homogeneous mixture was observed. The resulting mixture (final reaction mixture) was placed in a lined (polytetrafluoroethylene) stainless steel pressure vessel and digested at a temperature (150° C., 200° C. or 225° C.) for a time. Alternatively, if the digestion temperature was 100° C. the final reaction mixture was placed in a lined (polytetrafluoroethylene) screw top bottle for a time. All digestions were carried out at the autogenous pressure. The products were removed from the reaction vessel, cooled and evaluated.

ZnAPSO Molecular Sieves

The ZnAPSO molecular sieves of U.S. Ser. No. 600,170, filed Apr. 13, 1984 comprise framework structures of $ZnO_2^{-2}$, $AlO_2^-$, $PO_2^+$ and $SiO_2$ tetrahedral units having an empirical chemical composition on an anhydrous basis expressed by the formula:

$$mR:(Zn_wAl_xP_ySi_z)O_2$$

wherein "R" represents at least one organic templating agent present in the intracrystalline pore system; "m" represents the molar amount of "R" present per mole of $(Zn_wAl_xP_ySi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01. The mole fractions "w", "x", "y" and "z" are generally defined being within the limiting compositional values or points in FIG. 1 as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of ZnAPSO molecular sieves the values "w", "x", "y" and "z" in the above formula are within the limiting compositional values or points in FIG. 2 as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

ZnAPSO compositions are generally synthesized by hydrothermal crystallization at effective process conditions from a reaction mixture containing active sources of zinc, silicon, aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ZnAPSO product are obtained, usually a period of from several hours to several weeks. Generally the effective crystallization period is from about 2 hours to about 30 days with typical periods of from about 4 hours to about 20 days being employed to obtain ZnAPSO products. The product is recovered by any convenient method such as centrifugation or filtration.

In synthesizing the ZnAPSO compositions, it is preferred to employ a reaction mixture composition expressed in terms of the molar ratios as follows:

$$aR:(Zn_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, more preferably between about 2 and about 300; and "w", "x", "y" and "z" represent the mole fractions of zinc, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points in FIG. 3 as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing zinc, aluminum, phosphorus and silicon as framework tetrahedral oxide units are prepared as follows:

Preparative Reagents

ZnAPSO compositions were prepared using numerous reagents. The reagents employed and abbreviations employed herein, if any, for such reagents are as follows:

(a) Alipro: aluminum isopropoxide;
(b) LUDOX-LS: LUDOX-LS is the trade name of DuPont for an aqueous solution of 30 weight percent $SiO_2$ and 0.1 weight percent $Na_2O$;
(c) CATAPAL: Trademark of Condea Corporation for hydrated pseudoboehmite;
(d) $H_3PO_4$: 85 weight percent aqueous phosphoric acid;
(e) ZnAc: Zinc Acetate, $Zn(C_2H_3O_2)_2.4H_2O$;
(f) TEAOH: 40 weight percent aqueous solution of tetraethylammonium hydroxide;
(g) TBAOH: 40 weight percent aqueous solution of tetrabutylammonium hydroxide;
(h) TMAOH: Tetramethylammonium hydroxide pentahydrate, $(CH_3)_34NOH.5H_2O$;
(i) TPAOH: 40 weight percent aqueous solution of tetrapropylamonium hydroxide, $(C_3H_7)_4NOH$;
(j) $Pr_2NH$: di-n-propylamine, $(C_3H_7)_2NH$;
(k) $Pr_3N$: Tri-n-propylamine, $(C_3H_7)_3N$;
(l) Quin: Quinuclidine, $(C_7H_{13}N)$;
(m) C-hex: cyclohexylamine; and
(n) DEEA: diethylethanolamine, $(C_2H_5)_2NC_2H_5OH$.

Preparative Procedure

The ZnAPSO compositions were prepared by preparing reaction mixtures having a molar composition expressed as:

$$eR:fZnO:gAl_2O_3:hP_2O_5:iSiO_2:jH_2O$$

wherein e, f, g, h, i and j represent the moles of template R, zinc (expressed as the oxide), $Al_2O_3$, $P_2O_5$($H_3PO_4$ expressed as $P_2O_5$), $SiO_2$ and $H_2O$, respectively.

The reaction mixtures were prepared by forming a starting reaction mixture comprising the H$_3$PO$_4$ and a portion of the water. This mixture was stirred and the aluminum source added. The resulting mixture was blended until a homogeneous mixture was observed. The LUDOX LS was then added to the resulting mixture and the new mixture blended until a homogeneous mixture was observed. The zinc source (zinc acetate) was dissolved in the remaining water and combined with the first mixture. The combined mixture was blended until a homogenous mixture was observed. The organic templating agent was added to this mixture and blended for about two to four minutes until a homogenous mixture was observed. The resulting mixture (final reaction mixture) was placed in a lined (polytetrafluoroethylene) stainless steel pressure vessel and digested at an effective temperature for an effective time. All digestions were carried out at the autogenous pressure. The products were removed from the reaction vessel, cooled and evaluated.

FeAPSO Molecular Sieves

The FeAPSOs of U.S. Ser. No. 600,173, filed Apr. 13, 1984, now U.S. Pat. No. 4,683,217, are molecular sieves having three-dimensional microporous crystal framework structures of FeO$_2^{-2}$, (and/or FeO$_2^{-}$), AlO$_2^{-}$, PO$_2^{+}$ and SiO$_2$ tetrahedral oxide units and having a unit empirical formula, on an anhydrous basis, of:

$$mR:(Fe_wAl_xP_ySi_z)O_2 \quad (1)$$

wherein "R" represents at least one organic templating agent present in the intracrystalline pore system; "m" represents the moles of "R" present per mole of (Fe$_w$Al$_x$P$_y$Si$_z$)O$_2$ and has a value of from zero (0) to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides, said mole fractions being such limiting compositional values or points in FIG. 1 as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

The values of w, x, y, and z in FIG. 2 may be as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

The FeAPSOs of the instant invention are generally synthesized by hydrothermal crystallization from a reaction mixture comprising reactive sources of iron, aluminum, phosphorus and silicon, and preferably one or more organic templating agents. Optionally, alkali or other metal(s) may be present in the reaction mixture and may act as templating agents. The reaction mixture is generally placed in a pressure vessel, preferably lined with an inert plastic material, such as polytetrafluoroethylene, and heated, preferably under the autogenous pressure, at an effective temperature which is generally between about 50° C., and about 250° C. and preferably between about 100° C. and 200° C. until crystals of the FeAPSO product are obtained, ususally a period of from several hours to several weeks. Molecular sieves containing iron, aluminum, phosphorus and silicon as framework tetrahedral oxide units are prepared as follows:

Preparative Reagents

FeAPSO compositions were prepared using numerous reagents. The reagents employed and abbreviations employed herein, if any, for such reagents are as follows:

(a) Alipro: aluminum isopropoxide, Al(OCH(CH$_3$)$_2$)$_3$;
(b) LUDOX-LS: LUDOX-LS is the trademark of Du Pont for an aqueous solution of 30 weight percent SiO$_2$ and 0.1 weight percent Na$_2$O;
(c) CATAPAL: trademark for hydrated aluminum oxide containing about 75 wt. % Al$_2$O$_3$ (pseudoboehmite phase) and about 25 wt. percent water.
(c) Fe(Ac)$_2$: Iron (II) acetate;
(d) FeSO$_4$: Iron (II) sulfate hexahydrate;
(e) H$_3$PO$_4$: 85 weight percent phosphoric acid in water;
(f) TEAOH: 40 weight percent aqueous solution of tetraethylammonium hydroxide;
(g) TBAOH: 40 weight percent aqueous solution of tetrabutylammonium hydroxide;
(h) Pr$_2$NH: di-n-propylamine ((C$_3$H$_7$)$_2$NH);
(i) Pr$_3$N: tri-n-propylamine ((C$_3$H$_7$)$_3$N);
(j) Quin: Quinuclidine (C$_7$H$_{13}$N);
(k) MQuin: Methyl Quinuclidine hydroxide (C$_7$H$_{13}$NCH$_3$OH);
(l) TMAOH: tetramethylammonium hydroxide pentahydrate; and
(m) C-hex; cyclohexylamine.

(a) Examples were carried out to demonstrate the preparation of FeAPSO-34 and FeAPSO-5. The reaction mixtures were prepared by grinding the aluminum isopropoxide in a blender followed by slowly adding the H$_3$PO$_4$ solution with mixing. A solution/dispersion of iron acetate in water was added and then the LUDOX-LS was added. The organic templating agent was then added to this mixture, or in some cases one-half of this mixture, and the mixture blended to form a homogeneous mixture. The number of moles of each component in the reaction mixture was as follows:

| Component | Moles |
|---|---|
| Al$_2$O$_3$ | 0.9 |
| P$_2$O$_5$ | 0.9 |
| SiO$_2$ | 0.2** |
| FeO* | 0.2 |
| TEAOH | 1.0 |
| H$_2$O | 50 |

*Iron (II) acetate reported as Iron (II) oxide.
**SiO$_2$ was 0.6 in examples 5C to 8C Each reaction mixture was sealed in a stainless steel pressure vessel lined with polytetrafluoroethylene and heated in an oven at a temperature, time and at the autogenous pressure. The solid reaction product was recovered by filtration, washed with water and dried at room temperature.

(b) Examples were carried out to demostrate the preparation of FeAPSO-11 and FeAPSO-5. The reaction mixtures were prepared by grinding the aluminum iso-propoxide in a blender followed by addition of a solution/dispersion of iron (II) acetate. $H_3PO_4$ was added to this mixture and the resulting mixture blended to form a homogeneous mixture. LUDOX-LS was added to this mixture except that in some examples the LUDOX-LS was added with the $H_3PO_4$. The resulting mixtures were blended until a homogeneous mixture was observed. Organic templating agent was added to each mixture and the resulting mixtures placed in a stainless steel pressure vessel lined with polytetrafluoroethylene and heated, washed and the product recovered as in part a) of this example. The products were analyzed. The number of moles of each component in the reaction mixture was as follows:

| Component | Moles |
| --- | --- |
| $Al_2O_3$ | 0.9 |
| $P_2O_5$ | 0.9 |
| $SiO_2$ | 0.2 |
| FeO* | 0.2 |
| Template | 1.0 |
| $H_2O$ | 50 |

*Iron (II) acetate reported as Iron (II) oxide.

CoMnAPSO Molecular Sieves

CoMnAPSO molecular sieves are disclosed in U.S. Pat. No. 4,741,892. The CoMnAPSO molecular sieves have an empirical chemical composition on an anhydrous basis expressed by the formula:

$$mR:(Co_uMn_vAl_xP_ySi_z)O_2$$

wherein "R" represents at least one organic templating agent present in the intracrystalline pore system; "m" represents the molar amount of "R" present per mole of $(Co_uMn_vAl_xP_ySi_z)O_2$ from zero (0) to about 0.3; and "u", "v", "x", "y" and "z" represent the mole fractions of cobalt, manganese, aluminum, phosphorus and silicon, respectively, present as tetrahedral oxides. The mole fractions "u", "v", "x", "y", and "z" are generally defined as being within the limiting compositional values or points in FIG. 1 as follows, wherein "w", the combined mole fractions of manganese and cobalt, is the sum of "u" and "v":

| Point | Mole Fraction | | |
| --- | --- | --- | --- |
| | x | y | (z + w) |
| A | 0.60 | 0.37 | 0.03 |
| B | 0.37 | 0.60 | 0.03 |
| C | 0.01 | 0.60 | 0.39 |
| D | 0.01 | 0.01 | 0.98 |
| E | 0.60 | 0.01 | 0.39 |

Preferably the mole fractions u, v, x, y and z will fall within the limiting compositional value or points in FIG. 2 as follows:

| | Mole Fraction | | |
| --- | --- | --- | --- |
| | x | y | (z + w) |
| a | 0.55 | 0.42 | 0.03 |
| b | 0.42 | 0.55 | 0.03 |
| c | 0.10 | 0.55 | 0.35 |
| d | 0.55 | 0.10 | 0.35 |

CoMnAPSO compositions are generally synthesized by hydrothermal crystallization from a reaction mixture containing reactive sources of cobalt, manganese, aluminum, phosphorus and silicon and preferably an organic templating agent, i.e., structure-directing, agent. The structure-directing agents are preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogenous pressure and at typical effective temperatures between 50° C. and 250° C., preferably between 100° C. and 200° C., until crystals of the CoMnAPSO product are obtained, usually over a period of from several hours to several weeks. Typical effective crystallization times are from about 2 hours to 30 days with from about 4 hours to about 20 days being generally employed to obtain CoMnAPSO products. The product is recovered by any convenient method such as centrifugation or filtration.

In synthesizing the CoMnAPSO compositions, it is preferred to employ a reaction mixture composition expressed in terms of the molar ratios in FIG. 3 as follows:

$$aR:(Co_uMn_vAl_xP_ySi_z)O_2: bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "u", "v", "x", "y", and "z" represent the mole fractions of elements cobalt, manganese, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points as follows:

| | Mole Fraction | | |
| --- | --- | --- | --- |
| | x | y | (z + w) |
| F | 0.60 | 0.37 | 0.03 |
| G | 0.37 | 0.60 | 0.03 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "u", "v", "x", "y" and "z" such that (u+v+x+y+z)=1.00 mole. CoMnAPSO compositions were prepared using numerous regents. The reagents employed and abbreviations employed herein, if any, for such reagents are as follows:

(a) Alipro: aluminum isopropoxide;

(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent phosphoric acid;
(d) MnAc: Manganese acetate, $Mn(C_2H_3O_2)_2 \cdot 4H_2O$;
(e) CoAc: Cobalt Acetate, $Co(C_2H_3O_2)_2 \cdot 4H_2O$;
(f) TEAOH: 40 weight percent aqueous solution of tetraethylammonium hydroxide; and
(g) $Pr_2NH$: di-n-propylamine, $(C_3H_7)_2NH$.

Preparative Procedures

Preparative examples were carried out by forming a starting reaction mixture by adding the $H_3PO_4$ and one half of the quantity of water. To this mixture the aluminum isopropoxide was added. This mixture was then blended until a homogeneous mixture was observed. To this mixture the LUDOX-LS was added and the resulting mixture blended (about 2 minutes) until a homogeneous mixture was observed. A second mixture was prepared using manganese acetate and one half of the remaining water. A third mixture was prepared using cobalt acetate and one half of the remaining water. The three mixtures were admixed and the resulting mixture blended until a homogeneous mixture was observed. The organic templating agent was then added to the resulting mixture and the resulting mixture blended until a homogeneous mixture was observed, i.e., about 2 to 4 minutes. The pH of the mixture was measured and adjusted for temperature. The mixture was then placed in a lined (polytetrafluoroethylene) stainless steel pressure vessel and digested at a temperature. All digestions were carried out at the autogenous pressure.

CoMnMoAPSO Molecular Sieves

The CoMnMgAPSO molecular sieves of U.S. Ser. No. 600,182, filed Apr. 13, 1984 have three-dimensional microporous framework structures of $CoO_2^{-2}$, $MnO_2^{-2}$, $MgO_2^{-2}$, $AlO_2^-$, $PO_2^+$ and $SiO_2$ tetrahedral oxide units and have an empirical chemical composition on an anhydrous basis expressed by the formula:

$$mR:(Co_tMn_uMg_vAl_xP_ySi_z)O_2$$

wherein "R" represents at least one organic templating agent present in the intracrystalline pore system; "m" represents the molar amount of "R" present per mole of $(Co_tMn_uMg_vAl_xP_ySi_z)O_2$, and has a value of from zero to about 0.3; and "t", "u", "v", "x", "y" and "z" represent the mole fractions of cobalt, manganese, magnesium, aluminum, phosphorus and silicon, respectively, present as tetrahedral oxides, each having a value of at least 0.01. The mole fractions "t", "u", "v", "x", "y" and "z" are generally defined as being within the limiting compositional values or points in FIG. 1 as follows, wherein "w", the combined mole fractions of cobalt, manganese and magnesium, is the sum of "t", "u" and "v":

| Point | Mole Fraction | | |
|---|---|---|---|
| | x | y | (z + w) |
| A | 0.60 | 0.6 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the CoMnMgAPSO molecular sieves the values of "w", "x", "y" and "z" in the above formula are within the limiting compositional values or points in FIG. 2 as follows:

| Point | Mole Fraction | | |
|---|---|---|---|
| | x | y | (z + w) |
| a | 0.55 | 0.41 | 0.04 |
| b | 0.41 | 0.55 | 0.04 |
| c | 0.10 | 0.55 | 0.35 |
| d | 0.55 | 0.10 | 0.35 |

The CoMnMgAPSOs of this invention are useful as adsorbents, catalysts, ion-exchangers, and the like in much the same fashion as aluminosilicates have been employed heretofore, although their chemical and physical properties are not necessarily similar to those observed for aluminosilicates.

CoMnMgAPSO compositions are generally synthesized by hydrothermal crystallization from a reaction mixture containing reactive sources of cobalt, manganese, magnesium, aluminum, phosphorus and silicon, and preferably an organic templating agent, i.e., structure-directing, agent. The structure-directing agents are preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the CoMnMgAPSO product are obtained, usually over a period of from several hours to several weeks. Typical crystallization times are from about 2 hours to about 30 days with from about 4 hours to about 20 days generally being employed to obtain CoMnMgAPSO products. The product is recovered by any convenient method such as centrifugation or filtration.

In synthesizing the CoMnMgAPSO compositions, it is preferred to employ a reaction mixture composition expressed in terms of the molar ratios as follows:

$$aR:(Co_tMn_uMg_vAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "t", "u", "v", "x", "y", and "z" represent the mole fractions of cobalt, manganese, magnesium, aluminum, phosphorus and silicon, respectively, and each has a value of at least 0.01.

In a preferred embodiment the reaction mixture is selected such that the mole fractions "w", "x", "y" and "z", where "w" is the sum of "t"+"u"+"v", are generally defined as being within the limiting compositional values or points in FIG. 3 as follows:

| Point | Mole Fraction | | |
|---|---|---|---|
| | x | y | (z + w) |
| F | 0.60 | 0.36 | 0.04 |
| G | 0.36 | 0.60 | 0.04 |
| H | 0.01 | 0.60 | 0.39 |
| I | 0.01 | 0.01 | 0.98 |

-continued

| Point | Mole Fraction | | |
|---|---|---|---|
| | x | y | (z + w) |
| J | 0.60 | 0.01 | 0.39 |

In the foregoing expression of the reaction composition, the reactants are normalized with respect to the total of "t", "u", "v", "x", "y" and "z" such that $(t+u+v+x+y+z)=1.00$ mole. Molecular sieves containing cobalt, manganese, magnesium, aluminum, phosphorus and silicon as framework tetrahedral oxide units are prepared as follows:

Preparative Reagents

CoMnMgAPSO compositions were prepared using numerous reagents. The reagents employed and abbreviations employed herein, if any, for such reagents are as follows:
(a) Alipro: aluminum isopropoxide;
(b) LUDOX-LS: LUDOX-LS is the tradename of Du Pont for an aqueous solution of 30 weight percent $SiO_2$ and 0.1 weight percent $Na_2O$;
(c) $H_3PO_4$: aqueous solution which is 85 weight percent phosphoric acid;
(d) MnAc: Manganese acetate, $Mn(C_2H_3O_2)_2.4H_2O$;
(e) CoAc: Cobalt Acetate, $Co(C_2H_3O_2)_2.4H_2O$;
(f) MgAc: Magnesium Acetate $Mg(C_2H_3O_2).4H_2O$;
(g) TEAOH: 40 weight percent aqueous solution of tetraethylammonium hydroxide; and
(h) $Pr_2NH$: di-n-propylamine, $(C_3H_7)_2NH$.

Preparative Procedures

Preparative examples were carried out by forming a starting reaction mixture by adding the $H_3PO_4$ and one-half of the quantity of water. To this mixture the aluminum isoproxide was added. This mixture was then blended until a homogeneous mixture was observed. To this mixture the LUDOX-LS was added and the resulting mixture blended (about 2 minutes) until a homogeneous mixture was observed.

Three additional mixtures were prepared using cobalt acetate, magnesium acetate and manganese acetate using one-third of the remainder of the water for each mixture. The four mixtures were then admixed and the resulting mixture blended until a homogeneous mixture was observed. The organic templating agent was then added to the resulting mixture and the resulting mixture blended until a homogeneous mixture was observed, i.e., about 2 to 4 minutes. The mixture was then placed in a lined (polytetrafluoroethylene) stainless steel pressure vessel and digested at a temperature for a time. All digestions were carried out at the autogenous pressure.

SAPO Molecular Sieves

The silicoaluminophosphate molecular sieves of U.S. Pat. No. 4,440,871 are described as microporous crystalline silicoaluminophosphates the pores of which are uniform and have nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" represents the moles of "R" present per mole of $(Si_x Al_yP_z)O_2$; "m" has a value of from 0.02 to 0.3; "x", "y" and "z" represent the mole fractions of silicon, aluminum and phosphorus respectively, present as tetrahedral oxides, said mole fractions being such that they are within the pentagonal compositional area defined by points A, B, C, D and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the moles of "R" present per mole of $(Si_x Al_yP_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which is FIG. 1 of U.S. Pat. No. 4,440,871, said silicoaluminophosphate having a characteristic X-ray powder diffraction pattern which contains at least the d-spacings set forth below in any one of Tables I, III, V, VII, IX, XII, XV, XVII, XXI, XXIII or XXV of U.S. Pat. No. 4,440,871. Further, such crystalline silicoaluminophosphates may be calcined at a temperature sufficiently high to remove at least some of any organic templating agent present in the intracrystalline pore system. The silicoaluminophosphates of U.S. Pat. No. 4,440,871 are generally referred to therein as "SAPO-n", as a class, or as "SAPO-n" wherein "n" is an interger denoting a particular SAPO as its preparation is reported in U.S. Pat. No. 4,440,871.

There has now been discovered a novel class of framework-substituted crystalline microporous aluminophosphates in which the substituent metal is one or a mixture of two or more divalent metals of the group magnesium, manganese, zinc and cobalt, and which exhibit adsorption, ion-exchange and/or catalytic properties similar to the prior known aluminosilicate, aluminophosphate and silicoaluminophosphate molecular sieve compositions. Members of this novel class of compositions have a three-dimensional microporous crystal framework structure of $MO_2^{-2}$, $AlO_2^{-2}$ and $PO_2^+$ tetrahedral units and have an essential empirical chemical composition, on an anhydrous basis, of:

$$mR:(M_xAl_yP_z)O_2$$

wherein "R" represents at least one organic templating agent present in the intracrystalline pore system; "m" represents the moles of "R" present per mole of $(M_xA;_yP_z)O_2$ and has a value of from zero to 0.3, the maximum value in each case depending upon the molecular dimensions of the templating agent and the available void volume of the pore system of the particular metal aluminophosphate involved; "x", "y", and "z" represent the mole fractions of the metal "M", (i.e., magnesium, manganese, zinc and cobalt), aluminum and phosphorus, respectively, present as tetrahedral oxides, said mole fractions being such that they are representing the following values for "x", "y", and "z" in FIG. 1 of U.S. Pat. No. 4,567,029:

| Point | Mole Fraction | | |
|---|---|---|---|
| | x | y | (z) |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized in accordance with the novel process of the present invention, the minimum value of "m" in the formula above is 0.02. In a preferred subclass of the metal aluminophosphates of this invention, the values of "x", "y" and "z" in the formula above are confined to those representing the following values for "x", "y" and "z" in FIG. 2 of U.S. Pat. No. 4,567,029:

| Point | Mole Fraction | | |
|---|---|---|---|
| | x | y | (z) |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The metal aluminophosphates of this new class of compositions exhibit molecular sieving properties, and, in common with zeolitic aluminosilicates, are capable of reversibly adsorbing water and other molecular species. Many are capable of reversibly undergoing complete dehydration without loss or change in crystal structure. All of the as-synthesized compositions of this invention are capable of withstanding 350° C. calcination in air for extended periods, i.e., at least 2 hours, without becoming amorphous. While it is believed that the M, Al and P framework constituents are present in tetrahedral coordination with oxygen, it is theoretically possible that some minor fraction of these framework constituents are present in coordination with five or six oxygen atoms. It is not, moreover, necessarily the case that all of the M, Al and/or P content of any given synthesized product be a part of the framework in the aforesaid types of coordination with oxygen. Some of each constituent may be merely occluded or in some as yet undetermined form and may or may not be structurally significant.

Since the term "metal aluminophosphate" is somewhat cumbersome, particularly in view of the need for numerous repetitions thereof in describing the compositions of the present invention in this specification, the "short-hand" reference "MeAPO" is sometimes employed hereinafter. Also in those cases where the metal "Me" in the composition is magnesium, the acronym MAPO is applied to the composition. Similarly, ZAPO, MnAPO, and CoAPO are applied to the compositions which contain zinc, manganese and cobalt, respectively. To identify the various structural species which make up each of the subgeneric classes MAPO, ZAPO, CoAPO and MnAPO, each species is assigned a number and is identified, for example, as ZAPO-5, MAPO-11, CoAPO-34 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $AlO_2^-$ and/or $MO_2^{-2}$ tetrahedra not associated with $PO_2^+$ tetrahedra or an organic ion derived from the organic templating agent.

The aforesaid novel metal aluminophosphates are synthesized by hydrothermal crystallization from a reaction mixture containing reactive sources of the metal "M", alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature between 100° C. and 225° C., and preferably between 100° C. and 200° C. until crystals of the metal aluminophosphate product are obtained, usually a period of from 4 hours to 2 weeks. The product is recovered by any convenient method such as centrifugation or filtration.

In synthesizing the MeAPO compositions of the present invention, it is preferred to employ a reaction mixture composition expressed in terms of molar ratios as follows:

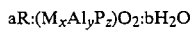

$$aR:(M_xAl_yP_z)O_2:bH_2O$$

wherein "R" is an organic templating agent; "a" has a value great enough to constitute an effective concentration of "R" and is within the range of >0 to 6; "b" has a value of from zero to 500, preferably 2 to 30; "M" represents a metal of the group zinc, magnesium, manganese and cobalt, "x", "y" and "z" represent the mole fractions, respectively, of "M", aluminum and phosphorus in the $(M_xAl_yP_z)O_2$ constituent, and each has a value of at least 0.01, the said points E, F, G, H, I, and J representing the following values for "x", "y" and "z" in FIG. 3 of U.S. Pat. No. 4,567,029:

| Point | Mole Fraction | | |
|---|---|---|---|
| | x | y | (z) |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(M+Al+P)=(x+y+z)=1.00$ mole.

In forming the reaction mixture from which the present metal aluminophosphates are crystallized the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P, and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tripropylamine; triethylamine; triethanolamine; piperidine; cyclohexylamine; 2-methylpyridine; N,N-dimethylbenzylamine; N-N-dimethylethanolamine; choline; N,N'-dimethylpiperazine; 1,4-diazabicyclo (2,2,2) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of metal aluminophosphate (MeAPO), i.e., a single templating agent can, with proper manipulation of the reaction conditions, direct the formation of several MeAPO compositions, and a given MeAPO composition can be produced using several different templating agents.

The most suitable phosphorus source yet found for the present process is phosphoric acid, but organic phosphates such as triethylphosphate have been found satisfactory, and so also have crystalline or amorphous aluminophosphates such as the AlPO$_4$ composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The preferred aluminum source is either an aluminum alkoxide, such as aluminum isopropoxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The metals zinc, cobalt, magnesium and manganese can be introduced into the reaction system in any form which permits the formation in situ of reactive divalent ions of the respective metals. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, and the like.

While not essential to the synthesis of MeAPO compositions, it has been found that in general, stirring or other moderate agitation of the reaction mixture and/or seeding the reaction mixture with seed crystals of either the MeAPO species to be produced or a topologically similar aluminophosphate or aluminosilicate composition, facilitates the crystallization procedure.

After crystallization the MeAPO product is isolated and advantageously washed with water and dried in air. The as-synthesized MeAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular MeAPO species. As a general rule, the templating agent, and hence the occluded organic species, is too large to move freely through the pore system of the MeAPO product and must be removed by calcining the MeAPO at temperatures of 200° C. to 700° C. to thermally degrade the organic species. In a few instances the pores of the MeAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the MeAPO phase wherein the organic moiety occupying the intracrystalline pore system as a result of the hydrothermal crystallization process has been reduced by post-synthesis treatment such that the value of "m" in the composition formula

$$mR:(M_xAl_yP_z)O_2$$

has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized MeAPO material.

Since the present MeAPO compositions are formed from AlO$_2$, PO$_2$, and MO$_2$ tetrahedral units which, respectively, have a net charge of $-1$, $+1$, and $-2$, the matter of cation exchangeability is considerably more complicated than in the case of zeolitic molecular sieves in which, ideally, there is a stoichiometric relationship between AlO$_2$ tetrahedra and charge-balancing cations. In the MeAPO compositions, an AlO$_2^-$ tetrahedron can be balanced electrically either by association with a PO$_2^+$ tetrahedron or a simple cation such as an alkali metal cation, a cation of the metal "M" present in the reaction mixture, or an organic cation derived from the templating agent. Similarly an MO$_2^-$ tetrahedron can be balanced electrically by associaton with PO$_2^+$ tetrahedra, a cation of the metal "M", organic cations derived from the templating agent, or other divalent or polyvalent metal cations introduced from an extraneous source. It has also been postulated that non-adjacent AlO$_2^-$ and PO$_2^+$ tetrahedral pairs can be balanced by Na$^+$ and OH$^-$, respectively [Flanigen and Grose, Molecular Sieve Zeolites-I, ACS, Washington, D.C. (1971)].

In any event, all of the MeAPO compositions of the present invention examined to date have exhibited cation-exchange capacity, in some cases to a significant degree, when analyzed using ion-exchange techniques heretofore employed with zeolitic aluminosilicates. All have uniform pore diameters which are inherent in the lattice structure of each species and which are at least about 3 Å in diameter. Ion exchange is ordinarily possible only after the organic moiety present as a result of synthesis has been removed from the pore system. Dehydration to remove water present in the as-synthesized MeAPO compositions can usually be accomplished, to some degree at least, in the usual manner without removal of the organic moiety, but the absence of the organic species greatly facilitates adsorption and desorption procedures. As illustrated hereinafter, the MeAPO materials have various degrees of hydrothermal and thermal stability, some being quite remarkable in this regard, and function well as molecular sieve adsorbents and hydrocarbon conversion catalyst or catalyst bases.

There has now been discovered a novel class of framework-substituted crystalline microporous aluminophosphates in which the substituent metal is iron, and which exhibit adsorption, ion-exchange and/or catalytic properties similar to the prior known aluminosilicate, aluminophosphate and silicoaluminophosphate molecular sieve compositions. Members of this novel clas of ferroaluminophosphates have a three-dimensional microporous crystal framework structure of $AlO_2$, $FeO_2$, and $PO_2$ tetrahedral units and have an essential empirical chemical composition, on an anhydrous basis, of:

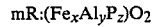

wherein "R" represents at least one organic templating agent present in the intracrystalline pore system; "m" represents the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved; "x", "y", and "z" represent the mole fractions of iron, aluminum and phosphorus, respectively, present as tetrahedral oxides, representing the following values for "x", "y", and "z" in FIG. 1 of U.S. Pat. No. 4,554,143:

| Point | Mole Fraction | | |
|---|---|---|---|
| | x | y | (z + w) |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized in accordance with the novel process of the present invention, the minimum value of "m" in the formula above is 0.02. In a preferred subclass of the ferroaluminophosphates of this invention, the values of "x", "y" and "z" in the formula above are representing the following values for "x", "y" and "z" in FIG. 2 of U.S. Pat. No. 4,554,143:

| Point | Mole Fraction | | |
|---|---|---|---|
| | x | y | (z + w) |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The iron of the $FeO_2$ structural units of the present compositions can be in either the ferric or ferrous valence state, depending largely upon the source of the iron in the synthesis gel. Thus, an $FeO_2$ tetrahedron in the structure can have a net charge of either $-1$ or $-2$. While it is believed that the Fe, Al and P framework constituents are present in tetrahedral coordination with oxygen (and are referred to herein as such), it is theoretically possible that some minor fraction of these framework constituents are present in coordination with five or six oxygen atoms. It is not, moreover, necessarily the case that all of the Fe, Al and/or P content of any given synthesized product is a part of the framework in the aforesaid types of coordination with oxygen. Some of each constituent may be merely occluded or in some as yet undetermined form, and may or may not be structurally significant.

The ferroaluminophosphates of this new class of compositions exhibit molecular sieving properties, and, in common with zeolitic aluminosilicates, are capable of reversibly adsorbing water and other molecular species. Many are capable of reversibly undergoing complete dehydration without loss or change in crystal structure.

For convenience in describing the compositions of the present invention in this specification, the "shorthand" acronym "FAPO" is sometimes employed hereinafter. To identify the various structural species which make up the generic class FAPO, each species is assigned a number and is identified, for example, as FAPO-5, FAPO-11, FAPO-34 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $FeO_2^-$ and/or $AlO_2^{-2}$ tetrahedra, $FeO_2^{-2}$ tetrahedra associated with $PO_2^+$ tetrahedra or not associated with $PO_2^+$ tetrahedra or an organic ion derived from the organic templating agent.

The aforesaid novel ferroaluminophosphates are synthesized by hydrothermal crystallization from a reaction mixture containing reactive sources of iron oxide, alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature of at least 100° C., and preferably between 100° C. and 250° C. until crystals of the metal aluminophosphate product are obtained, usually a period of from 2 hours to 2 weeks. The product is recovered by any convenient method such as centrifugation or filtration.

In synthesizing the FAPO compositions of the present invention, it is preferred to employ a reaction mixture composition expressed in terms of molar ratios as follows:

$$aR:(Fe_xAl_yP_z)O_2:bH_2O$$

wherein "R" is an organic templating agent; "a" has a value great enough to constitute an effective concentration of "R" and is within the range of >0 to 6; "b" has a value of from zero to 500, preferably 2 to 80; "x", "y" and "z" represent the mole fractions, respectively, of iron, aluminum and phosphorus in the $(Fe_xAl_yP_z)O_2$ constituent, and each has a value of at least 0.01, and representing the following values for "x", "Y" and "z" in FIG. 3 of U.S. Pat. No. 4,554,143:

| Point | Mole Fraction | | |
|---|---|---|---|
| | x | y | (z + w) |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| 1 | 0.40 | 0.59 | 0.01 |
| J | 0.29 | 0.70 | 0.01 |

In the foregoing expression of the reaction composition, the reactants are normalized with respect to a total of $(Fe+Al+P)=(x+y+z)=1.00$ mole.

In forming the reaction mixture from which the present ferroaluminophosphates are crystallized, the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tri-n-propylamine; triethylamine; triethanolamine; piperidine; cyclohexylamine; 2-methylpyridine; N,N-dimethylbenzylamine; N-N-dimethylethanolamine; choline; N,N'-dimethylpiperazine; 1,4-diazabicyclo (2,2,2) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of ferroaluminophosphate (FAPO), i.e., a single templating agent can, with proper manipulation of the reaction conditions, direct the formation of several FAPO compositions, and a given FAPO composition can be produced using several different templating agents.

The most suitable phosphorus source yet found for the present process is phosphoric acid, but organic phosphates such as triethylphosphate have been found satisfactory, and so also have crystalline or amorphous aluminophosphates such as the $AlPO_4$ composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The preferred aluminum source is either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

Iron can be introduced into the reaction system in any form which permits the formation in situ of reactive ferrous or ferric ions. Advantageously iron salts, oxides or hydroxides are employed such as iron sulfate, iron acetate, iron nitrate, or the like. Other sources such as a freshly precipitated iron oxide —FeOOH, are also suitable.

While not essential to the synthesis of FAPO compositions, it has been found that in general, stirring or other moderate agitation of the reaction mixture and/or seeding the reaction mixture with seed crystals of either the FAPO species to be produced or a topologically similar aluminophosphate or aluminosilicate composition, facilitates the crystallization procedure.

After crystallization the FAPO product is isolated and advantageously washed with water and dried in air. The as-synthesized FAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular FAPO species. As a general rule, the templating agent, and hence the occluded organic species, is too large to move freely through the pore system of the FAPO product and must be removed by calcining the FAPO at temperatures of 200° C. to 700° C. to thermally degrade the organic species. In a few instances the pores of the FAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the FAPO phase wherein the organic moiety occupying the intracrystalline pore system as a result of the hydrothermal crystallization process has been reduced by post-synthesis treatment such that the value of "m" in the composition formula

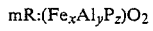

has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized FAPO material.

Since the present FAPO compositions are formed from $AlO_2^-$, $PO_2^+$, $FeO_2^-$ and/or $FeO_2^{-2}$ units the matter of cation exchangeability is considerably more complicated than in the case of zeolitic molecular sieves in which, ideally, there is a stoichiometric relationship between $AlO_2$ tetrahedra and charge-balancing cations. In the FAPO compositions, an $AlO_2^-$ tetrahedron can be balanced electrically either by association with a $PO_2^+$ tetrahedron or a simple cation such as an alkali metal cation, a $Fe^{+2}$ or $Fe^{+3}$ cation present in the reaction mixture, or an organic cation derived from the templating agent. Similarly an $FeO_2^-$ or $FeO_2^{-2}$ tetrahedron can be balanced electrically by association with $PO_2^{+2}$ tetrahedron, a $Fe^{+2}$ or $Fe^{+3}$ cation, organic cations derived from the templating agent, or other metal cation introduced from an extraneous source. It has also been postulated that non-adjacent $AlO_2^-$ and $PO_2^+$ tetrahedral pairs can be balanced by $Na^+$ $and$ $OH^-$ respectively [Flanigen and Grose, Molecular Sieve Zeolites-I, ACS, Washington, D.C. (1971)].

In any event, all of the FAPO compositions of the present invention examined to date have exhibited cation-exchange capacity, in some cases to a significant degree, when analyzed using ion-exchange techniques heretofore employed with zeolitic aluminosilicates. All have uniform pore diameters which are inherent in the lattice structure of each species and which are at least about 3 Å in diameter. Ion exchange is ordinarily possible only after the organic moiety present as a result of synthesis has been removed from the pore system. Dehydration to remove water present in the as-synthesized FAPO compositions can usually be accomplished, to some degree at least, in the usual manner without removal of the organic moiety, but the absence of the organic species greatly facilitates adsorption and desorption procedures. As illustrated hereinafter, the FAPO materials have various degrees of hydrothermal and thermal stability, some being quite remarkable in this regard, and function well as molecular sieve adsorbents and hydrocarbon conversion catalyst or catalyst bases.

The present invention relates to titanium-containing molecular sieves comprising a three-dimensional microporous crystal framework structure of $[TiO_2]$, $[AlO_2]$ and $[PO_2]$ tetrahedral units which has a unit empirical formula on an anhydrous basis of:

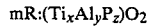 (1)

wherein "R" represents at least one organic templating agent present in the intracrystalline pore system; "m" represents the moles of "R" present per mole of $(Ti_xAl_yP_z)O_2$ and has a value of between zero and about 5.0, the maximum value in each case depending upon the molecular dimensions of the templating agent and the available void volume of pore system of the particular titanium molecular sieve; "x", "y" and "z" represent the mole fractions of titanium, aluminum and phosphorus, respectively, present as tetrahedral oxides, representing the following values for "x", "y" and "z" in FIG. 1 of U.S. Pat. No. 4,500,651:

| Point | Mole Fraction | | |
|---|---|---|---|
| | x | y | (z) |
| A | 0.001 | 0.45 | 0.549 |
| B | 0.88 | 0.01 | 0.11 |
| C | 0.98 | 0.01 | 0.01 |
| D | 0.29 | 0.70 | 0.01 |
| E | 0.001 | 0.70 | 0.299 |

Figure 2:
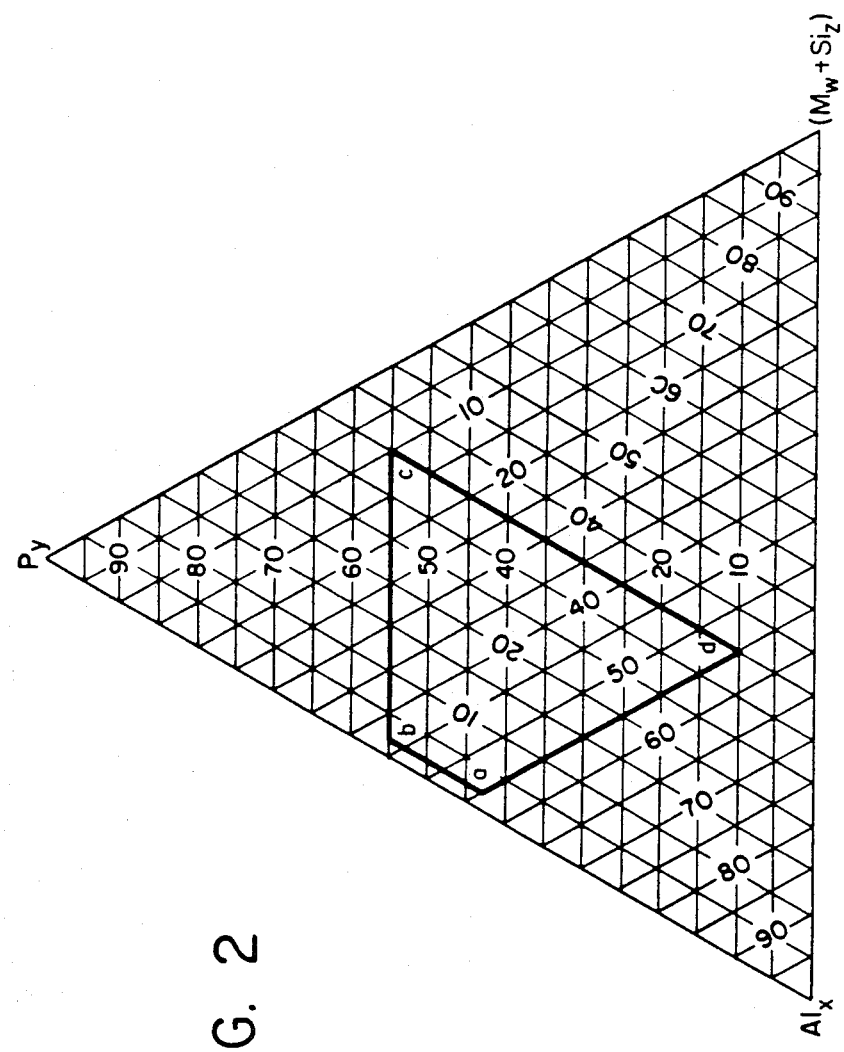
FIG. 2 is a ternary diagram wherein parameters referring to preferred ELAPSO compositions are set forth as mole fractions.

The parameters "x", "y" and "z" are preferably within the following values for "x", "y" and "z" in FIG. 2 of U.S. Pat. No. 4,550,651:

| Point | Mole Fraction | | |
|---|---|---|---|
| | x | y | (z + w) |
| a | 0.002 | 0.499 | 0.499 |
| b | 0.20 | 0.40 | 0.40 |
| c | 0.20 | 0.50 | 0.30 |
| d | 0.10 | 0.60 | 0.30 |
| e | 0.002 | 0.60 | 0.398 |

The molecular sieves of the present invention are generally employable as catalysts for various hydrocarbon conversion processes.

The molecular sieves employed in the instant process will be referred to hereinafter, solely for point of reference herein as "TAPO" molecular sieves, or as "TAPOs" if the reference is to the class as a whole. This designation is simply made for the sake of convenient reference herein and is not meant to designate a particular structure for any given TAPO molecular sieve. The members of the class of TAPO's employed hereinafter in the examples will be characterized simply by referring to such members as TAPO-5, TAPO-11, etc, i.e , a particular species will be referred to as TAPO-n where "n" is a number specific to a given class member as its preparation is reported herein. This designation is an arbitrary one and is not intended to denote structural relationship to another material(s) which may also be characterized by a numbering system.

The term "unit empirical formula" is used herein according to its common meaning to designate the simplest formula which gives the relative number of moles of titanium, aluminum and phosphorus which form the $[TiO_2]$, $[PO_2]$ and $[AlO_2]$ tetrahedral unit within a titanium-containing molecular sieve and which forms the molecular framework of the TAPO composition(s). The unit empirical formula is given in terms of titanium, aluminum and phosphorus as shown in Formula (1), above, and does not include other compounds, cations or anions which may be present as a result of the preparation or the existence of other impurities or materials in the bulk composition not containing the aforementioned tetrahedral unit. The amount of template R is reported as part of the composition when the as-synthesized unit empirical formula is given, and water may also be reported unless such is defined as the anhydrous form. For convenience, coefficient "m" for template "R" is reported as a value that is normalized by dividing the number of moles of organic by the total moles of titanium, aluminum and phosphorus.

The unit empirical formula for a TAPO may be given on an "as-synthesized" basis or may be given after an "as-synthesized" TAPO composition has been subjected to some post treatment process, e.g., calcination. The term "as-synthesized" herein shall be used to refer to the TAPO composition(s) formed as a result of the hydrothermal crystallization but before the TAPO composition has been subjected to post treatment to remove any volatile components present therein. The actual value of "m" for a post-treated TAPO will depend on several factors (including: the particular TAPO, template, severity of the post-treatment in terms of its ability to remove the template from the TAPO, the proposed application of the TAPO composition, and etc.) and the value for "m" can be within the range of values as defined for the as-synthesized TAPO compositions although such is generally less than the as-synthesized TAPO unless such post-treatment process adds template to the TAPO so treated. A TAPO composition which is in the calcined or other post-treatment form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The molecular sieves of the present invention are generally further characterized by an intracrystalline adsorption capacity for water at 4.6 torr and about 24° C. of about 3.0 weight percent. The adsorption of water has been observed to be completely reversible while retaining the same essential framework topology in both the hydrated and dehydrated state. The term "essential framework topology" is meant to designate the spatial arrangement of the primary bond linkages. A lack of change in the framework topology indicates that there is no disruption of these primary bond linkages.

The molecular sieves of the instant invention are generally synthesized by hydrothermal crystallization from a reaction mixture comprising reactive sources of titanium, aluminum and phosphorus, and one or more organic templating agents. Optionally, alkali metal(s) may be present in the reaction mixture. The reaction mixture is placed in a pressure vessel, preferably lined with an inert plastic material, such as polytetrafluoroethylene, and heated, preferably under the autogenous pressure, at a temperature of at least about 100° C., and preferably between 100° C. and 250° C., until crystals of the molecular sieve product are obtained, usually for a period of from 2 hours to 2 weeks. While not essential to the synthesis of the instant molecular sieves, it has been found that in general stirring or other moderate agitation of the reaction mixture and/or seeding the reaction mixture with seed crystals of either the TAPO to be produced, or a topologically similar composition, facilitates the crystallization procedure. The product is recovered by any convenient method such as centrifugation or filtration.

After crystallization the TAPO may be isolated and washed with water and dried in air. As a result of the hydrothermal crystallization, the as-synthesized TAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed TAPO and may be removed by a post-treatment process, such as by calcining the TAPO at temperatures of between about 200° C. and to about 700° C. so as to thermally degrade the template or by employing some other post-treatment process for removal of at least part of the template from the TAPO. In some instances the pores of the TAPO are sufficiently large to permit transport of the template, and, accordingly, complete or partial removal thereof can be accomplished by conventional desorption procedures such as carried out in the case of zeolites.

The TAPOs are preferably formed from a reaction mixture having a mole fraction of alkali metal cation which is sufficiently low that it does not interfere with the formation of the TAPO composition. The TAPO compositions are generally formed from a reaction mixture containing reactive sources of $TiO_2$, $Al_2O_3$, and $P_2O_5$ and an organic templating agent, said reaction mixture comprising a composition expressed in terms of molar oxide ratios of:

$$fR_2O:(Ti_xAl_yP_z)O_2:g\ H_2O$$

wherein "R" is an organic templating agent; "f" has a value large enough to constitute an effective amount of "R" said effective amount being that amount which form said TAPO compositions; "g" has a value of from zero to 500; "x", "y" and "z" represent the mole fractions, respectively of titanium, aluminum and phosphorus in the $(Ti_xAl_yP_z)O_2$ constituent, and each has a value of at least 0.001 and being within the following values for "x", "y" and "z" in FIG. 3 of U.S. Pat. No. 4,500,651:

| Point | Mole Fraction | | |
|---|---|---|---|
| | x | y | (z + w) |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

Although the TAPO compositions will form if higher concentrations of alkali metal cation are present, such reaction mixtures are not generally preferred. A reaction mixture, expressed in terms of molar oxide ratios, comprising the following bulk composition is preferred:

$$oR_2O:wM_2O:(Ti_xAl_yP_z)O_2:nH_2O$$

wherein "R" is an organic template; "o" has a value great enough to constitute an effective concentration of "R" and is preferably within the range of from greater than zero (0) to about 5.0; "M" is an alkali metal cation; "w" has a value of from zero to 2.5; "n" has a value between about zero (0) and about 500; "x", "y" and "z" represent the mole fractions, respectively of titanium, aluminum and phosphorus in the $(Ti_xAl_yP_z)O_2$ constituent, and each has a value of at least 0.001 and being within the following values for "x", "y" and "z" in FIG. 3 of U.S. Pat. No. 4,500,651:

| | Mole Fraction | | |
|---|---|---|---|
| Point | x | y | (z + w) |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

When the TAPOs are synthesized by this method the value of "m" in Formula (1) is generally above about 0.02.

Though the presence of alkali metal cations is not preferred, when they are present in the reaction mixture it is preferred to first admix at least a portion (e.g., at least about 10 weight percent) of each of the aluminum and phosphorus sources in the substantial absence (e.g., preferably less than about 20 percent of the total weight of the aluminum source and phosphorus source) of the titanium source. This procedure avoids adding the phosphorus source to a basic reaction mixture containing the titanium source and aluminum source, (as was done in most of the published attempts to substitute isomorphously [$PO_2$] tetrahedra for [$SiO_2$] tetrahedra in zeolitic structures). Although the reaction mechanism is by no means clear at this time, the function of the template may be to favor the incorporation of [$PO_2$] and [$AlO_2$] tetrahedra in the framework structures of the crystalline products with [$TiO_2$] tetrahedra isomorphously replacing [$PO_2$] tetrahedra.

The reaction mixture from which these TAPOs are formed contains one or more organic templating agents (templates) which can be most any of those heretofore proposed for use in the synthesis of aluminosilicates and aluminophosphates. The template preferably contains at least one element of Group VA of the Periodic Table, particularly nitrogen, phosphorus, arsenic and/or antimony, more preferably nitrogen or phosphorus and most preferably nitrogen and are of the formula $R_4X^+$ wherein X is selected from the group consisting of nitrogen, phosphorus, arsenic and/or antimony and R may be hydrogen, alkyl, aryl, aralkyl, or alkylaryl group and is preferably aryl or alkyl containing between 1 and 8 carbon atoms, although more than eight carbon atoms may be present in "R" of group of the templae. Nitrogen-containing templates are preferred, including amines and quaternary ammonium compounds, the latter being represented generally by the formula $R'_4N^+$ wherein each R' is an alkyl, aryl, alkylaryl, or aralkyl group; wherein R' preferably contains from 1 to 8 carbon atoms or higher when R' is alkyl and greater than 6 carbon atoms when R' is otherwise, as hereinbefore discussed. Polymeric quaternary ammonium salts such as [($C_{14}H_{32}N_2$) $(OH)_2$]$_x$ wherein "x" has a value of at least 2 may also be employed. The mono-, di- and triamines, including mixed amines, may also be employed as templates either alone or in combination with a quaternary ammonium compound or another template. The exact relationship of various templates when concurrently employed is not clearly understood. Mixtures of two or more templating agents can produce either mixtures of TAPOs or in the instance where one template is more strongly directing than another template the more strongly directing template may control the course of the hydrothermal crystallization wherein with the other template serving primarily to establish the pH conditions of the reaction mixture.

Representative templates include tetramethylammonium, tetraethylammonium, tetrapropylammonium or tetrabutylammonium ions; di-n-propylamine; tripropylamine; triethylamine; triethanolamine; piperidine; cyclohexylamine; 2-methylpyridine; N,N-dimethylbenzylamine N,N-diethylethanolamine; dicyclohexylamine; N,N-dimethylethanolamine; 1,4-diazabicyclo (2,2,2) octane; N-methyldiethanolamine, N-methyl- ethanolamine; N-methylcyclohexylamine; 3-methyl- pyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. As will be readily apparent from the illustrative examples set forth hereinafter, not every template will produce every TAPO composition although a single template can, with proper selection of the reaction conditions, cause the formation of different TAPO compositions, and a given TAPO composition can be produced using different templates.

In those instances where an aluminum alkoxide is the reactive aluminum source, the corresponding alcohol is necessarily present in the reaction mixture since it is a hydrolysis product of the alkoxide. It has not as yet been determined whether this alcohol participates in the synthesis process as a templating agent, or in some other function and, accordingly, is not reported as a template in the unit formula of the TAPOs, although such may be acting as templates.

Alkali metal cations if present in the reaction mixture may facilitate the crystallization of certain TAPO phases, although the exact function of such cations, when present, in crystallization, if any, is not presently known. Alkali cations present in the reaction mixture generally appear in the formed TAPO composition, either as occluded (extraneous) cations and/or as structural cations balancing net negative charges at various sites in the crystal lattice. It should be understood that although the unit formula for the TAPOs does not specifically recite the presence of alkali cations they are not excluded in the same sense that hydrogen cations and/or hydroxyl groups are not specifically provided for in the traditional formulae for zeolitic aluminosilicates.

Most any reactive titanium source may be employed herein. The preferred reactive titanium sources include titanium alkoxides, water-soluble titanates and titanium chelates.

Most any reactive phosphorous source may be employed. Phosphoric acid is the most suitable phosphorus source employed to date. Accordingly, other acids of phosphorus are generally believed to be suitable phosphorus sources for use herein. Organic phosphates such as triethyl phosphate have been found satisfactory, and so also have crystalline or amorphous aluminophosphates such as the $AlPO_4$ compositions of U.S. Pat. No. 4,310,440. Organo-phosphorus compounds, such as tetrabutyl-phosphonium bromide have not, apparently, served as reactive sources of phosphorus, but these compounss do function as templating agents and may also be capable of being suitable phosphorus sources under proper process conditions (yet to be ascertained). Organic phosphorus compounds, e.g., esters, are believed to be generally suitable since they can generate acids of phosphorus in situ. Conventional phosphorus salts, such as sodium metaphosphate, may be used, at least in part as the phosphorus source, but they are not preferred.

Most any reactive aluminum source may be employed herein. The preferred reactive aluminum sources include aluminum alkoxides, such as aluminum isopropoxide, and pseudoboehmite. Crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but as generally not preferred.

Since the exact nature of the TAPO molecular sieves of the present invention are not clearly understood at present, although all are believed to contain [TiO$_2$] tetrahedra in the three-dimensional microporous crystal framework structure, it is advantageous to characterize the TAPO molecular sieves by means of their chemical composition. This is due to the low level of titanium present in certain of the instant molecular sieves prepared to date which makes it difficult to ascertain the exact nature of the interaction between titanium, aluminum and phosphorus. As a result, although it is believed that titanium, [TiO$_2$], has substituted isomorphously for [AlO$_2$] or [PO$_2$] tetrahedra, it is appropriate to characterize certain TAPO compositions by reference to their chemical composition in terms of the mole ratios of oxides in the as-synthesized and anhydrous form as:

$$vR:pTiO_2:qAl_2O_3:rP_2O_5$$

wherein "R" represents at least one organic templating agent present in the intracrystalline pore system; "v" represents an effective amount of the organic templating agent to form said TAPO compositions and preferably has a value between and including zero and about 3.0; "p", "q" and "r" represent moles, respectively, of titanium, alumina and phosphorus pentaoxide, based on said moles being such that they are within the following values for "p", "q" and "r" in FIG. 1 of U.S. Pat. No. 4,500,651.

| Point | Mole Fraction | | |
|---|---|---|---|
| | p | q | r |
| A | 0.004 | 1.0 | 1.22 |
| B | 176 | 1.0 | 11.0 |
| C | 196 | 1.0 | 1.0 |
| D | 0.828 | 1.0 | 0.0143 |
| E | 0.003 | 1.0 | 0.427 |

The parameters "p", "q" and "r" are preferably within the following values for "p", "q" and "r" in FIG. 2 of U.S. Pat. No. 4,500,651:

| Point | Mole Fraction | | |
|---|---|---|---|
| | p | q | r |
| a | 0.008 | 1.0 | 1.0 |
| b | 1.0 | 1.0 | 1.0 |
| c | 0.80 | 1.0 | 0.60 |
| d | 0.333 | 1.0 | 0.50 |
| e | 0.067 | 1.0 | 0.663 |

The instant invention relates to a new class of crystalline molecular sieves in which at least two elements capable of forming three-dimensional microporous framework form crystal framework structures of AlO$_2^-$, PO$_2^+$ and MO$_2^n$ tetrahedral oxide units wherein MO$_2^n$ represents at least two different elements present as tetrahedral units "MO$_2^n$" with charge "n" where "n" may be $-3$, $-2$, $-1$, 0 or $+1$. These new molecular sieves exhibit ion-exchange, adsorption and catalytic properties and accordingly find wide use as adsorbents and catalysts. The members of this novel class of compositions have crystal framework structures of AlO$_2^-$, PO$_2^+$ and MO$_2^n$ tetrahedral units and have an empirical chemical composition on an anhydrous basis expressed by the formula:

$$mR:(M_xAl_yP_z)O_2$$

wherein "R" represents at least one organic templating agent present in the intracrystalline pore system; "m" represents the molar amount of "R" present per mole of $(M_xAl_yP_z)O_2$; "M" represents at least two elements capable of forming framework tetrahedral oxides; and "x", "y" and "z" represent the mole fractions of "M", aluminum and phosphorus, respectively, present as tetrahedral oxides. "M" is at least two different elements (M$_1$ and M$_2$) such that the molecular sieves contain at least two framework tetrahedral units in addition to AlO$_2^-$ and PO$_2^+$. "M" is at least one element selected from the group consisting of arsenic, beryllium, boron, chromium, gallium, germanium, lithium and vanadium and is at least one element selected from the group consisting of cobalt, iron, magnesium, manganese, titanium and zinc.

The molecular sieves of the instant invention will be generally referred to herein by the acronym of "ELAPO" to designate elements "M" in a framework of AlO$_2^-$, PO$_2^+$ and MO$_2^n$ tetrahedral units. Actual class members will be identified by replacing the "EL" of the acronym with the elements present as MO$_2^n$ tetrahedral units. For example, "MgBeAPO" designates a molecular sieve comprised of AlO$_2^-$, PO$_2^+$ and MgO$_2^{-2}$ and BeO$_2^{-2}$ tetrahedral units. To identify various structural species which make up each of the subgeneric classes, each species is assigned a number and is identified as "ELAPO-i" wherein "i" is an integer. The given species designation is not intended to denote a similarity in structure to any other species denominated by a similar identification system.

The instant invention relates to a new class of molecular sieves in which at least two elements capable of forming framework tetrahedral oxides are provided to form crystal framework structures of AlO$_2^-$, PO$_2^+$ and MO$_2^n$ tetrahedral wherein "M" represents at least two elements capable of forming tetrahedral units M$_1$O$_2^{n''}$ and "M$_2$O$_2^{n'''}$" where "M$_1$" and "M$_2$" are two different elements, where "n" is $-3$, $-2$, $-1$, 0 or $+1$ and where "M$_1$" is at least one element selected from the group consisting of arsenic, beryllium, boron, chromium, gallium, germanium, lithium and vanadium and "M$_2$" is at least one element selected from the group consisting of cobalt, iron, magnesium, manganese, titanium and zinc. These new molecular sieves exhibit ion-exchange, adsorption and catalytic properties and accordingly find wide use as adsorbents and catalysts.

The members of this novel class of compositions have crystalline three-dimensional microporous framework structures of AlO$_2^-$, PO$_2^+$ and MO$_2^n$ tetrahedral units and can have an empirical chemical composition on an anhydrous basis expressed by the formula:

$$mR:(M_xAl_yP_z)O_2;$$

wherein "R" represents at least one organic templating agent present in the intracrystalline pore system; "m" represents the molar amount of "R" present per mole of $(M_xAl_yP_z)O_2$ and has a value of zero to about 0.3; "M"

represents at least two elements capable of forming framework tetrahedral oxides where "M" is at least one element selected from the group consisting of arsenic, beryllium, boron, chromium, gallium, germanium, lithium and vanadium; and at least one element selected from wherein "R" represents at least one organic templating agent present in the intracrystalline pore system; "m" represents the molar amount of "R" present per mole of $(M_xAl_yP_z)O_2$ and has a value of zero to about 0.3; "M" represents at least two elements capable of forming framework tetrahedral oxides where "M" is at least one element selected from the group consisting of arsenic, beryllium, boron, chromium, gallium, germanium, lithium and vanadium; and at least one element selected from the group consisting of cobalt, iron, magnesium, manganese, titanium, and zinc.

The relative amounts of elements "M", aluminum and phosphorus are expressed by the empirical chemical formula (anhydrous):

$$mR:(M_xAl_yP_z)O_2$$

where "x", "y" and "z" represent the mole fractions of said "M", aluminum and phosphorus. The individual mole fractions of each "M" ($M_1$, $M_2$, $M_3$, etc.) may be represented by "$x_1$", "$x_2$", "$x_3$", etc. wherein "$x_1$", "$x_2$", and "$x_3$", etc. represent the individual mole fractions of elements $M_1$, $M_2$, $M_3$, and etc. for "M" as above defined. The values of "$x_1$", "$x_2$", "$x_3$", etc. are as defined for "x", hereinafter, where "$x_1$"+"$x_2$"+"$x_3$" ... ="x" and where $x_1$, $x_2$, $x_3$, etc. are each at least 0.01.

The molecular sieves of the instant invention have crystalline three-dimensional microporous framework structures of $MO_2^n$, $AlO_2^-$ and $PO_2^+$ tetrahedral units having an empirical chemical composition on an anhydrous basis expressed by the formula:

$$mR:(M_xAl_yP_z)O_2$$

wherein "R" represents at least one organic templating agent present in the intracrystalline pore system; "m" represents a molar amount of "R" present per mole of $(M_xAl_yP_z)O_2$ and has a value of zero to about 0.3; "M" represents at least two different elements capable of forming framework tetrahedral oxides, as hereinbefore defined, and "x", "y" and "z" represent the mole fractions of "M", aluminum and phosphorus, respectively, present as tetrahedral oxides; said mole fractions "x", "y" and "z" being generally defined as within the following values for "x", "y", and "z":

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred sub-class of the ELAPOs of this invention, the values of "x", "y" and "z" in the formula above are within the following values for "x", "y" and "z":

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

The ELAPOs of this invention are useful as adsorbents, catalysts, ion-exchangers, and the like in much the same fashion as aluminosilicates have been employed heretofore, although their chemical and physical properties are not necessarily similar to those observed for aluminosilicates.

ELAPO compositions are generally synthesized by hydrothermal crystallization from a reaction mixture containing reactive sources of the elements "M", aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ELAPO product are obtained, usually a period of from several hours to several weeks. Typical crystallization times are from about 2 hours to about 30 days with from about 2 hours to about 20 days being generally employed to obtain crystals of the ELAPO products. The product is recovered by any convenient method such as centrifugation or filtration.

In synthesizing the ELAPO compositions of the instant invention, it is preferred to employ a reaction mixture composition expressed in terms of the molar ratios as follows:

$$aR:(M_xAl_yP_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; "M" represents at least two elements, as above described, capable of forming tetrahedral oxide framework units, $MO_2^n$, with $AlO_2^-$ and $PO_2^+$ tetrahedral units; "n" has a value of $-3, -2, -1, 0$ or $+1$; and "x", "y" and "z" represent the mole fractions of "M", aluminum and phosphorus, respectively, "y" and "z" each have a value of at least 0.01 and "x" has a value of at least 02 with each element "M" having a mole fraction of at least 0.01. The mole fractions "x", "y" and "z" are preferably within the following values for "x", "y" and "z":

| Point | Mole Fraction | | |
|---|---|---|---|
| | x | y | z |
| F | 0.02 | 0.60 | 0.38 |
| G | 0.02 | 0.38 | 0.60 |
| H | 0.39 | 0.01 | 0.60 |
| I | 0.98 | 0.01 | 0.01 |
| J | 0.39 | 0.60 | 0.01 |

In the foregoing expression of the reaction composition, the reactants are normalized with respect to a total of (M+Al+P)=(x+y+z)=1.00 mole, whereas in many of the working examples appearing hereinafter the reaction mixtures are expressed in terms of molar oxide ratios and may be normalized to 1.00 mole of $P_2O_5$. This latter form is readily converted to the former form by routine calculations by dividing the total number of moles of "M", aluminum and phosphorus into the moles of each of "M", aluminum ad phosphorus. The moles of template and water are similarly normalized by dividing the total moles of "M", aluminum and phosphorus.

In forming the reaction mixture from which the instant molecular sieves are formed the organic templating agent can be any of those heretofore proposed for use in the synthesis of conventional zeolite aluminosilicates. In general these compounds contain elements of Group VA of the Periodic Table of Elements, particularly nitrogen, phosphorus, arsenic and antimony, preferably nitrogen or phosphorus and most preferably nitrogen, which compounds also contain at least one alkyl or aryl group having from 1 to 8 carbon atoms. Particularly preferred compounds for use as templating agents are the amines, quaternary phosphonium compounds and quaternary ammonium compounds, the latter two being represented generally by the formula $R_4X^+$ wherein "X" is nitrogen or phosphorus and each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. The mono-, di- and tri-amines are advantageously utilized, either alone or in combination with a quaternary ammonium compound or other templating compound. Mixtures of two or more templating agents can either produce mixtures of the desired ELAPOs or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; tetrapentylammonium ion; di-n-propylamine; tripropylamine; triethylamine; triethanolamine; piperidine; cyclohexylamine; 2-methylpyridine; N,N-dimethylbenzylamine; N,N-dimethylethanolamine; choline; N,N'-dimethylpiperazine; 1,4-diazabicyclo (2,2,2,) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of ELAPO, i.e., a single templating agent can, with proper manipulation of the reaction conditions, direct the formation of several ELAPO compositions, and a given ELAPO composition can be produced using several different templating agents.

The most suitable phosphorus source yet found for the present process is phosphoric acid, but organic phosphates such as triethyl phosphate may be satisfactory, and so also may crystalline or amorphous aluminophosphates such as the $AlPO_4$ composition of U.S. Pat. No. 4,310,440. Organo-phosphorus compounds, such as tetrabutylphosphonium bromide, do not apparently serve as reactive sources of phosphorus, but these compounds may function as templating agents. Conventional phosphorus salts such as sodium metaphosphate, may be used, at least in part, as the phosphorus source, but are not preferred.

The preferred aluminum source is either an aluminum alkoxide, such as aluminum isopropoxide, or pseudo-boehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The elements "M" can be introduced into the reaction system in any form which permits the formation in situ of reactive form of the element, i.e., reactive to form the framework tetrahedral oxide unit of the element. The organic and inorganic salts, of "M" such as oxides, alkoxides, hydroxides, halides and carboxylates, may be employed including the chlorides, bromides, iodides, nitrates, sulfates, acetates, formates, ethoxides, propoxides and the like.

While not essential to the synthesis of ELAPO compositions, stirring or other moderate agitation of the reaction mixture and/or seeding the reaction mixture with seed crystals of either the ELAPO species to be produced or a topologically similar species, such as aluminophosphate, aluminosilicate or molecular sieve compositions, facilitates the crystallization procedure.

After crystallization the ELAPO product may be isolated and advantageously washed with water and dried in air. The as-synthesized ELAPO generally contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular ELAPO species. As a general rule the templating agent, and hence the occluded organic species, is too large to move freely through the pore system of the ELAPO product and must be removed by calcining the ELAPO at temperatures of 200° C. to 700° C. to thermally degrade the organic species. In a few instances the pores of the ELAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein does not include the condition of the ELAPO phase wherein the organic moiety occupying the intracrystalline pore system as a result of the hydrothermal crystallization process has been reduced by post-synthesis treatment such that the value of "m" in the composition formula

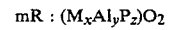
$mR : (M_xAl_yP_z)O_2$ has a value of less than 0.02. The other symbols of the formula are as defined hereinabove. In those preparations in which an alkoxide is employed as the source of element "M", aluminum or phosphorus, the corresponding alcohol is necessarily present in the reaction mixture since it is a hydrolysis product of the alkoxide. It has not been determined whether this alcohol participates in the synthesis process as a templating agent. For the purposes of this application, however, this alcohol is arbitrarily omitted from the class of templating agents, even if it is present in the as-synthesized ELAPO material.

Since the present ELAPO compositions are formed from $MO_2^n$, $AlO_2$, and $PO_2^+$ tetrahedral oxide units which, respectively, have a net charge of "n", (where "m" may be $-3$, $-2$, $-1$, 0 or $+1$), $-1$ and $+1$, the matter of cation exchangeability is considerably more complicated than in the case of zeolitic molecular sieves in which, ideally, there is a stoichiometric relationship between $AlO_2^-$ tetrahedra and charge-balancing cations. In the instant compositions, an $AlO_2^-$ tetrahedron can be balanced electrically either by association with a $PO_2^+$ tetrahedron or a simple cation such as an alkali metal cation, a proton ($H^+$), a cation of "M" present in the reaction mixture, or an organic cation derived from the templating agent. Similarly an $MO_2^n$ tetrahedron, where "n" is negative, can be balanced electrically by association with $PO_2^-$ tetrahedra, a cation of "M" present in the reaction mixture, organic cations derived from the templating agent, a simple cation such as an alkali metal cation, or other divalent or polyvalent metal cation, a proton ($H^+$), anions or cations introduced from an extraneous source. It has also been postulated that non-adjacent $AlO_2^-$, $PO_2^+$ pairs can be balanced by $N^+$ and $OH^-$. respectively [Flanigen and Grose, Molecular Sieve Zeolites-I, ACS, Washington, D.C. (1971)].

The ELAPO compositions of the present invention may exhibit cation-exchange capacity when analyzed using ion-exchange techniques heretofore employed with zeolitic aluminosilicates and have pore diameters which are inherent in the lattice structure of each species and which are at least about 3 Å in diameter. Ion exchange of ELAPO compositions is ordinarily possible only after the organic moiety derived from the template, present as a result of synthesis, has been removed from the pore system. Dehydration to remove water present in the as-synthesized ELAPO compositions can usually be accomplished, to some degree at least, in the usual manner without removal of the organic moiety, but the absence of the organic species greatly facilitates adsorption and desorption procedures. The ELAPO materials have various degrees of hydrothermal and thermal stability, some being quite remarkable in this regard, and function well as molecular sieve adsorbents and hydrocarbon conversion catalysts or catalyst bases.

NZ-MS CATALYSTS The specific NZ-MSs employed in the instant invention are characterized in their calcined form by an adsorption of isobutane of at least 2 percent by weight at a pressure of 500 torr and a partial temperature of 20° C. When the non-zeolitic molecular sieve is employed in conjunction with a zeolitic aluminosilicate cracking component the non-zelitic molecular sieve is preferably also characterized in its calcined form by an adsorption of triethylamine of less than 5 percent by weight at a partial pressure of 2.6 torr and a temperature of 22° C. In a further embodiment the non-zeolitic molecular sieves are employed without a zeolitic aluminosilicate and in such embodiment the non-zeolitic molecular sieve is preferably characterized by an adsorption of triethylamine greater than 5 percent by weight at a partial pressure of 2.6 torr and a temperature of 22° C.

NZ-MSs characterized by the above described adsorption of isobutane include, but are not limited to, ELAPSO-5, ELAPSO-11, ELAPSO-31, ELAPSO-37, ELAPSO-40, ELAPSO-41, CoAPSO-5, CoAPSO-11, CoAPSO-31, CoAPSO-37, CoAPSO-40, CoAPSO-41, FeAPSO-5, FeAPSO-11, FeAPSO-31, FeAPSO-40, FeAPSO-41, MgAPSO-5, MgAPSO-11, MgAPSO-31, MgAPSO-37, MgAPSO-40, MgAPSO-41, MnAPSO-5, MnAPSO-11, MnAPSO-31, MnAPSO-37, MnAPSO-40, MnAPSO-41, TiAPSO-5, TiAPSO-11, TiAPSO-31, TiAPSO-37, TiAPSO-40, TiAPSO-41, ZnAPSO-5, ZnAPSO-11, ZnAPSO-31, ZnAPSO-37, ZnAPSO-40, ZnAPSO-41, CoMgAPSO-5, CoMgAPSO-11, CoMgAPSO-31, CoMgAPSO-37, CoMgAPSO-40, CoMgAPSO-41, CoMnMgAPSO-5, CoMnMgAPSO-11, CoMnMgAPSO-31, CoMnMgAPSO-37, CoMnMgAPSO-40, CoMnMgAPSO-41, MeAPO-5, MeAPO-11, MeAPO-31, MeAPO-37, MeAPO-40, MeAPO-41, TiAPO-5, TiAPO-11, TiAPO-31, TiAPO-37, TiAPO-40, TiAPO-41, FeAPO-5, FeAPO-11, FeAPO-31, FeAPO-41, FCAPO-5, FCAPO-11, FCAPO-31, CAPO-37, FCAPO-40, FCAPO-41 and mixtures thereof.

The above characterization of the NZ-MSs employed in the instant invention relates to an adsorption characterization that is carried out on a NZ-MS which has been subjected to a post synthesis treatment, e.g., calcination or chemical treatment, to remove a substantial portion of the template "R" which is present as a result of synthesis. Although a particular NZ-MS is characterized herein by reference to its adsorption of isobutane or triethylamine as being to the adsorption characteriscs of the NZ-MS in its calcined form, the instant invention necessarily includes the use of a non-calcined or modified NZ-MSs which are characterized by such adsorption in the modified or calcined form, since upon use of such a non-calcined NZ-MS in the instant process at catalytic cracking conditions the NZ-MS will be calcined or hydrothermally treated in situ so as to have the characteristic adsorption of isobutane or triethylamine. Thus, the NZ-MS will be rendered in situ to a form characterized by the aforementioned adsorption characteristics. For example, an as-synthesized MgAPO-11 or MgAPSO-11 is not characterized by the aforementioned adsorption of isobutane due to the presence of template "R" which is present as a result of synthesis, although the calcined form of MgAPO-11 and MgAPSO-11 is characterized by the aforementioned adsorption of isobutane. Thus, reference to a NZ-MS having a particular adsorption characteristic in its calcined form is not intended to exclude the use of the NZ-MS in its as-synthesized form which upon in situ calcination, hydrothermal treatment and/or other treatment, e.g., ion exchange with suitable atoms, would have such adsorption characteristics.

It has been found that this class of NZ-MS may provide product distributions not formed by cracking catalysts containing zeolitic aluminosilicates. Heretofore, the catalysts of the prior art have exhibited a decrease in gasoline yield and/or conversion for the optimization of a particular process variable or product characteristic e.g., octane of the gasoline product. Such penalties are reduced by use of the instant catalysts. Further, improved production of isoparaffins and branched olefins and also by the decreased amount of normal paraffins and linear olefins by use of the instant catalysts are indications of higher octane products.

The term "crude oil feedstock" is used herein to denominate any crude oil feedstock or portion thereof and includes full range crude oils from primary, secondary or tertiary recovery from conventional or offshore oil fields and feedstocks derived therefrom. "Crude oil feedstocks" may also be "syncrudes" such as those that can be derived from coal, shale oil, tar sands and bitumens. The crude oil feedstock may be virgin (straight run) or generated synthetically by blending. Such crude oil feedstocks are traditionally desalted prior to use since sodium chloride is known to be a poison in many cracking operations. Further, the term "crude oil feedstocks" is intended to include component parts of crude oils which have heretofore been generally employed as catalytic cracking feeds or potential feeds and includes feeds such as distillate gas oils, heavy vacuum gas oils, VGO, atmospheric and vacuum resids, syncrudes, pulverized coal and fractions boiling above the traditional end of the gasoline boiling range which generally includes compounds containing greater than about eleven carbon atoms and combinations thereof.

The NZ-MSs of the instant invention may be employed in conjunction with traditional cracking catalysts and optionally, a zeolitic aluminosilicate cracking component may be employed in conjunction with the NZ-MS containing catalysts. The zeolitic aluminosilicate cracking component of such catalysts may be any aluminosilicate heretofore employed as a component in cracking catalysts. Representative of the zeolitic aluminosilicates disclosed heretofore as employable as component parts of cracking catalysts are Zeolite Y, Zeolite X, Zeolite beta (U.S. Pat. No. 3,308,069), Zeolite KZ-20 (U.S. Pat. No. 3,445,727), Zeolite ZSM-3 (U.S. Pat. No. 3,415,736), faujasite, LZ-10 (U.K. Patent 2,014,970, June 9, 1982), ZSM-type zeolites and mixtures thereof. Traditional cracking catalysts containing amounts of $Na_2O$ less than about one percent by weight are preferred.

Representative Y-type zeolites believed employable herein include, but are not limited to, those disclosed in U.S. Pat. Nos.: 3,130,007; 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,882 and 3,957,623.

Another zeolitic aluminosilicate employable herein is "LZ-210", as described in E.P.C. Publication No. 82,211 published June 29, 1983.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference.

FORMULATION OF NZ-MS CRACKING CATALYSTS

The catalysts of the instant invention comprise at least one NZ-MS, as above characterized, and optionally may also contain one or more traditional cracking catalysts, including zeolitic aluminosilicate cracking components. The relative amount of the NZ-MS component or zeolitic aluminosilicate component, if any, will depend at least in part, on the selected crude oil feedstock and on the desired product distribution to be obtained therefrom, but in all instances an effective amount of at least one NZ-MS is employed. When a zeolitic aluminosilicate is employed the relative weight ratio of the zeolitic aluminosilicate to the NZ-MS is generally between about 1:10 and about 500:1, desirably between about 1:10 and about 200:1, preferably between about 1:2 and about 50:1, and most preferably is between about 1:1 and about 20:1. The zeolitic aluminosilicate and NZ-MS may be ion-exchanged with a selected cation(s) and/or thermally treated either before or after mixture with each other or after such have been added separately or concurrently to one or more inorganic oxide matrix components. When the NZ-MS molecular sieves are ion exchanged such are preferably exchanged with a hydrogen-forming cation species, e.g. $NH_4^+$, $H^+$, quaternary ammonium cations, etc. The NZ-MS preferably has at least part of its cations as hydrogen-forming cation species.

The term "thermal treatment" is employed here to denominate both a thermal calcination in the presence of air or inert gas, e.g., nitrogen, and a hydrothermal calcination (thermal calcination in the presence of steam). The thermal treatment is carried out at an effective temperature and time and when a hydrothermal treatment in the presence of an effective amount of steam. The thermal treatment is typically carried out at a temperature in excess of 300° C. for a period in excess of 0.25 hours and when the thermal treatment is a hydrothermal treatment it is typically carried out in the presence of at least about 20 percent steam by volume in air and up to about 100 percent steam. The source of the steam is not important and may be provided from an external source or may be generated in situ at the temperatures employed for the hydrothermal treatment. As aforementioned a NZ-MS may be employed in the instant process in its as-synthesized form since in situ hydrothermal treatment will be provided upon introduction of the NZ-MS to the process under catalytic cracking conditions.

Any ion-exchange of the zeolitic aluminosilicate(s) and NZ-MS(s), which aluminosilicate or NZ-MS may have been subjected to thermal treatment, may be carried out by contacting such with a solution of at least one cation, including those selected from the group of cations consisting of ammonium, Group IIA, Group IIIA, Group IIIB to VIIB and rare earth cations selected from the group consisting of cerium, lanthanum, praseodymium, neodymium, promethium, samarium, europium, gadolinium, terbium, dysprosium, holmium, erbium, thulium, ytterbium, lutetium and mixtures thereof. The exact nature of the relationship of rare earth cations and NZ-MS and their effect on the activity of the NZ-MS-containing catalyst is not clearly understood at present. As a result of ion-exchange, the cation(s), e.g., rare earth cation, may replace at least a portion of the cations initially present in the zeolitic aluminosilicate or NZ-MS. The cations provided by ion-exchange may be present in an effective amount which may be between about 0.1 weight percent and about 20 weight percent, typically between about 0.5 and about 10 weight percent, based on the weight of the starting zeolitic aluminosilicate or NZ-MS.

The cracking catalysts of this invention are typically employed with an inorganic oxide matrix component which may be any of the inorganic oxide matrix components which have been employed heretofore in the formulation of FCC catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The zeolite and NZ-MS may be mixed separately with the matrix component and then mixed or the zeolite and NZ-MS may be mixed and then formed with the matrix component.

The inorganic oxide matrix component may be in the form of a sol, hydrogel or gel and is typically an alumina, silica, clay and/or silica-alumina component such as employed a conventional silica-alumina cracking catalyst, several types and compositions of which are commercially available. The matrix component may itself provide a catalytic effect or it may be essentially inert. The matrix may act as a "binder" in some instances, although in some instances the final catalyst may be spray dried or formed without the need of a binder. These materials may be prepared as a cogel of silica and alumina or as alumina precipitated on a preformed and preaged hydrogel. The silica may be present as a component in the solids present in such gels, e.g. present in an amount between about 5 and about 40 weight percent and preferably between about 10 and about 30 weight percent. Silica may also be employed in the form of a cogel comprising about 75 weight percent silica and about 25 weight percent alumina or comprising about 87 weight percent silica and about 13 weight percent alumina. The inorganic oxide marix component will typically be present in the catalyst in an amount between about 0 and about 99 weight percent, preferably between about 5 and about 95 weight percent, based on the total catalyst weight. It is also within the scope of the instant invention to employ other materials in addition to the zeolitic aluminosilicate, NZ-MS and inorganic oxide matrix components in the final cracking catalysts, including various other types of zeolites, clays, carbon monoxide oxidation promoters, etc.

Representative of matrix systems employable herein are disclosed in British Patent Specification No. 1,315,553, published May 2, 1973 and U.S. Pat. Nos. 3,446,727 and 4,086,187, such being incorporated herein by reference thereto.

As above mentioned, the catalysts of the present invention may be employed with a matrix component and this may be an alumina component. The alumina component may comprise discrete particles of various aluminas, e.g., pseudobeohmite. The alumina component may be in the form of discrete particles having a total surface area, as measured by the method of Brunauer, Emmett and Teller (BET), greater than about 20 square meters per gram ($M^2/g$), preferably greater than 145 $M^2/g$, for example, from about 145 to about 300 $M^2/g$. The pore volume of the alumina component is typically greater than 0.35 cc/g. The average particle size of the alumina particles is generally less than 10 microns and preferably less than 3 microns. The alumina may be employed alone as the matrix or composited with the other matrix components. The alumina component may be any alumina and has preferably been preformed and placed in a physical form such that its surface area and pore structure are stabilized so that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina may be any alumina which has been formed by suitable chemical reaction, the slurry aged, filtered, dried, washed free of residual salt and then heated to reduce its volatile content to less than about 15 weight percent. Further, an alumina hydrosol or hydrogel or hydrous alumina slurry may be used in the catalyst preparation.

The inorganic oxide matrix components, e.g. aluminas, silicas, clays, etc., may be present in the final catalyst in an amount ranging between about 5 and about 99 weight percent, preferably between about 5 and about 95 weight percent and more preferably between about 10 and about 85 weight percent, based on the total catalyst weight.

Mixtures of the zeolitic aluminosilicate, NZ-MS and the inorganic matrix may be formed into the final form for the catalyst by standard catalyst forming techniques including spray-drying, pelleting, extrusion and other suitable conventional means. Such catalysts are typically prepared by spray drying, such procedures being well known to those skilled in the art of preparing catalytic cracking catalysts. Although the exact reason for such is not presently understood, the instant catalysts have been observed to provide different results in some instances when employed in cracking processes depending on whether the zeolitic aluminosilicate and NZ-MS are coincidentally or separately mixed with the matrix component.

Catalytic cracking catalysts may be prepared by any one of several other conventional methods. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of impure silica-alumina hydrogel. The zeolitic aluminosilicate and NZ-MS may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically recovered after calcination.

Catalytic cracking with the catalyst of the present invention can be conducted in any catalytic cracking process under effective catalytic cracking conditions. Suitable catalytic cracking conditions include a temperature ranging between about 400° F. and about 1600° F., preferably between about 700° F. and about 1600° F. and a pressure ranging from about subatmospheric to several atmospheres, typically from about atmospheric to about 100 psig. The process may be carried out in a fixed fluidized bed, moving bed, ebulliating bed, slurry, transferline, riser reactor or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 420° F. to about 1800° F. to naphthas to yield not only products having a lower boiling point than the initial feed and gasoline products having an improved octane number.

The mixture of a traditional cracking and a NZ-MS may be carried out in any manner which results in the coincident presence of such in contact with the crude oil feedstock under catalytic cracking conditions. For example, a catalyst may be employed containing both the traditional cracking catalyst and a NZ-MS in single catalyst particles or NZ-MS, with or without a matrix component, may be added as a discrete component to a traditional cracking catalyst. In one embodiment, a NZ-MS may be added to a cracking process as a make-up catalyst to replace the traditional cracking catalyst that has been lost through attrition.

The following examples were carried out to illustrate the instant invention and are not intended to be limiting thereof. The zeolite LZ-210 was prepared in each example according to the disclosure of E.P.C. Publication No. 82,211, published June 29, 1983. SAPO molecular sieves were prepared according to U.S. Pat. No. 4,440,871. The SAPO molecular sieves were calcined in air prior to use in the following examples. Calcination procedures for the removal of template are disclosed in U.S. Pat. No. 4,440,871. The catalysts prepared in the following examples were evaluated by a procedure substantially the same as ASTM test method D-3907. Accordingly, reference to ASTM test method D-3907 hereinafter is meant to generally refer to the procedure of the ASTM test method with the following four modifications. First, the end boiling point of the products identified as gasoline products was 431° F. Second, the nitrogen post stripping of the catalyst was at 30 milliliters/min for a period of 23 minutes to 27 minutes. Third, the conversion is the measured conversion and not the standardized conversion of the ASTM test method. Fourth, the feedstock employed in the test method had an API gravity of 24.0°, an IBP (Initial Boiling Point) of 354° F., FBP (Final Boiling Point) of 1077° F. and a UOP K Factor of 11.8.

EXAMPLE 1

A cracking catalyst was prepared according to the invention employing a mixture of SAPO-5 and LZ-210. In addition, a cracking catalyst containing LZ-210 was prepared as a reference catalyst. The catalysts were prepared using LZ-210, having a $SiO_2/Al_2O_3$ ratio of 9.0, and SAPO-5. Two catalysts were prepared. Catalyst A was the reference catalyst and Catalyst B was a catalyst according to this invention. Catalyst A was prepared by slurrying 18% by weight LZ-210, 18% by weight of pseudobeohmite alumina, 60% by weight of a kaolin clay; 4% by weight of a silica and enough water to form a slurry having a 25% by weight solids content. The aforementioned percentages for the solid components are given on a dry basis. The slurry was then spray dried to obtain a fluidizable catalyst composite that would pass through a 150 micron sieve (U.S. Standard). The catalyst was then calcined at 600° C. for 1 hour and then steam deactivated at 740° C. for 2 hours in 100% steam. Catalyst B was prepared by mixing Catalyst A and SAPO-5. The SAPO-5 was steam deactivated at 760° C. for 2 hours in 100% steam prior to mixing with Catalyst A. The steam deactivation procedures are provided to simulate the environment experienced by commercial cracking catalysts. Catalyst B contained 10 percent by weight of SAPO-5 based on the total weight of Catalyst B.

Catalysts A and B were each evaluated according to ASTM test method D-3907. In this and in the subsequent examples the "Wt. % Conversion" is the measured weight percent conversion as defined in ASTM test method D-3907, as above discussed. The "wt. % Gasoline" is defined as those hydrocarbons in the product from $C_5$ hydrocarbons to hydrocarbons boiling below 431° F. expressed as a weight percent of feed. The term "alkylate" herein denominates propylene, butylenes and isobutane. The "Wt. % Gas" is defined as those hydrocarbons boiling below $C_4$ in the product as a weight percent of feed. The "Wt. % Coke" is defined as the residue left on the used catalyst after post stripping as set forth above and is given as a weight percent. The "Wt. % $C_4$s" is defined as the weight percent of isobutane, n-butane and butylenes of the product. The "Wt. % $C_6$–$C_8$Aromatics" is defined herein as the weight percent of benzene, ethyl benzene, toluene and xylenes in the gasoline product. The results were as follows:

|  | Catalyst | |
|---|---|---|
|  | Catalyst A | Catalyst B |
| Wt. % Conversion | 70.3 | 71.0 |
| Wt. % Gasoline | 50.0 | 49.3 |
| Wt. % Gasoline + Aklylate | 60.9 | 61.6 |
| Wt. % $C_6$—$C_8$ Aromatics | 14.6 | 15.4 |
| Wt. % Coke | 4.9 | 4.8 |
| Wt. % Gas | 6.2 | 6.7 |
| Wt. % $C_4$s | 9.1 | 10.2 |

The above data demonstrate that Catalyst B was comparable to Catalyst A as to Wt. % Conversion and Wt. % Gasoline while making more aromatic products which are useful in enhancing the octane of the gasoline products.

EXAMPLE 2

Two catalysts were prepared wherein Catalyst C was a reference catalyst containing LZ-210 having a $SiO_2/Al_2O_3$ ratio of 9.0 and Catalyst D was a catalyst according to the invention and contained LZ-210 and SAPO-11. Catalyst C was prepared by preparing a slurry containing 15% by weight LZ-210, 18% by weight of a pseudobeohmite alumina, 60% by weight kaolin clay and 4% by weight silica in enough water to obtain a slurry having 25 percent by weight solids. The slurry was then spray dried to obtain a fluidizable catalyst having its size characterized by passing through a 150 micron sieve (U.S. Standard). The catalyst was calcined at 600° C. for 1 hour and then steam deactivated at 765° C. for 2 hours in 100% steam.

Catalyst D was prepared according to the procedure employed for Catalyst C, except that 10 percent by weight kaolin clay was replaced by 10 percent by weight of SAPO-11, i.e. 50% by weight kaolin clay was employed.

Catalyst C and Catalyst D were evaluated according to ASTM test method D-3907, except that the run temperature was 850° F. instead of the 900° F. suggested by ASTM test method D-3907. The results were as follows:

|  | Catalyst | |
|---|---|---|
|  | Catalyst C | Catalyst D |
| Conversion: | 61.9 | 62.9 |
| Wt. % Gasoline: | 46.5 | 47.6 |
| Wt. % Gasoline + Alkylate | 55.3 | 56.7 |
| Wt. Paraffin Analysis[1]: | | |
| Iso/normal $C_4$ | 4.8 | 5.7 |
| Iso/normal $C_6$ | 13.6 | 17.1 |
| Iso/normal $C_7$ | 15.6 | 16.8 |
| Iso/normal $C_8$ | 7.1 | 8.1 |
| Wt. Gas Product Analysis[2]: | | |
| Olefin/paraffin $C_3$ | 2.8 | 3.8 |
| Olefin/paraffin $C_4$ | 0.55 | 0.66 |
| Wt. % Coke | 4.1 | 4.0 |

[1] Iso paraffin to normal paraffin ratios of compounds having the indicated number of carbons.
[2] Olefin to paraffin ratio of compounds having the indicated number of carbons.

The above results demonstrate that the addition of SAPO-11 as a component of Catalyst D provided products having comparable Wt. % Gasoline and Wt. % Gasoline+Alkylate while also providing for an increase in the iso to normal ratio of the paraffin products, thus indicating higher octane products. The increase in the olefin content of the gas product, as indicated by the Gas Product Analysis, indicates a gas product having more useful and valuable olefin products.

EXAMPLE 3

Two catalysts were prepared wherein Catalyst E was a reference catalyst containing LZ-210 ($SiO_2/Al_2O_3$ ratio of 9.0) and Catalyst F was a catalyst according to this invention containing LZ-210 and SAPO-5.

Catalyst E was prepared by forming a slurry of 15% by weight LZ-210, 18% by weight of a pseudobeohmite alumina, 63% by weight kaolin clay, 4% by weight silica and enough water to form a slurry containing 25 percent by weight solids. The slurry was then spray dried calcined and treated by the procedure employed for Catalyst C in Example 2.

Catalyst F was prepared by forming a slurry of 15% by weight LZ-210, 10% by weight SAPO-5, 18% by weight of a pseudobeohmite alumina, 53% by weight kaolin clay, 4% by weight silica and enough water to form a slurry containing 25% by weight solids. The slurry was then spray dried, calcined and treated by the procedure employed for Catalyst C in Example 2.

Catalyst E and Catalyst F were each evaluated according to ASTM test method D-3907. The results were as follows:

|  | Catalyst | |
|---|---|---|
|  | Catalyst E | Catalyst F |
| Wt. % Conversion | 77.2 | 76.8 |
| Wt. % Gasoline + Alkylate | 63.8 | 60.3 |
| Wt. % $C_6$—$C_8$ Aromatics | 33.4 | 37.8 |
| Wt. % Coke | 7.7 | 7.9 |
| Catalyst/Oil Ratio (Weight) | 5 | 3 |

The above data indicate that Catalyst F, according to this invention, was considerably more active than Catalyst E requiring only a Catalyst/Oil ratio of 3 to achieve a conversion comparable to Catalyst E employed at a Catalyst/Oil ratio of 5. This use of forty percent less catalyst to achieve comparable conversion demonstrates the surprising increase in activity of the catalyst comprising LZ-210 and SAPO-5. Further, Catalyst F formed products containing about 4.4 percent more $C_6$–$C_8$ aromatic products in the gasoline product with about a 3.5% reduction in the Wt. % Gasoline+Alkylate. The presence of increased amounts of aromatic products is an indication of higher octane products. Further, aromatic components are valuable as components in other chemical processes.

The above data also demonstrate that the order of mixing of the components in Catalyst F resulted in changes in the mixed catalyst, as compared to the mixed catalysts of example 1. The addition of SAPO-5 to the slurry, instead of physically mixing SAPO-5 with a Y zeolite/matrix mixture resulted in a more active catalyst than above described in example 1 for Catalyst B. The exact reasons for this change in activity as a result of the mixing order is not clearly understood at this time.

EXAMPLE 4

Two catalysts were prepared wherein Catalyst G was a reference catalyst containing ZSM-5 ($SiO_2$ to $Al_2O_3$ ratio of 30), as described in U.S. Pat. No. 4,239,654, and Catalyst H was a catalyst according to this invention containing SAPO-5.

A catalyst base was prepared by rare earth exchanging LZ-210 by use of a solution of a mixture of rare earth chlorides. The rare earth solution contained about 46.0% by weight, expressed on rare earth oxides, with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 1.0% other rare earths. The final rare earth exchanged LZ-210 had 9.9% by weight rare earth, measured as the oxide ($RE_2O_3$ where "RE" denotes rare earth cations). A mixture was formed by blending 14.3% by weight of the rare earth LZ-210, 80.7% of a silica-alumina (sold by Davison Division of W. R. Grace under the trademark MS13/110 and containing 86 wt. % $SiO_2$ and 13 wt. % $Al_2O_3$) and 5.0% by weight of a microcrystalline cellulose extrusion aid. This mixture was extruded, dried at 110° C. in air for 16 hours and then steam deactivated for 5 hours at 760° C. in 100% steam. The extrudates were then crushed and sized to 60 to 200 mesh (U.S. Standard).

Catalyst G and Catalyst H were prepared by mixing, respectively, 5 percent by weight of ZSM-5 and SAPO-5 with 95 percent by weight of the catalyst base, as above prepared. The two catalysts were evaluated according to ASTM test method D-3907. The results were as follows:

|  | Catalyst | |
|---|---|---|
|  | Catalyst G | Catalyst H |
| % Conversion: | 65.2 | 66.8 |
| % Gasoline: | 42.8 | 47.3 |
| % $C_6$—$C_8$ Aromatics in Gasoline: | 11.5 | 14.1 |
| Iso/Normal ratio ($C_6$ paraffin) | 7.3 | 11.2 |

The above data demonstrate the significant improvements in Wt. % Conversion, Wt. % Gasoline, Wt. % $C_6$-$C_8$ Aromatics in Gasoline and the iso to normal weight ratio of $C_6$ paraffins when SAPO-5 is employed as a component of the cracking catalyst as compared to the use of ZSM-5.

EXAMPLE 5

Two catalysts were prepared according to the procedure employed in example 2 for Catalyst C and Catalyst D, except that the steam deactivation temperatures were as set forth below in Table I. Catalysts derived from the non-steam deactivated precursor of Catalyst C by changing the steam deactivation temperature are denominated "Catalyst C-n" wherein "n" is an integer. Catalysts derived from the non-steam deactivated precursor of Catalyst D are similarly denominated. The catalysts were evaluated according to ASTM test method D-3907 and the following results obtained:

TABLE I

|  | Catalyst | | | | | | | |
|---|---|---|---|---|---|---|---|---|
|  | C | C-1 | C-2 | C-3 | D | D-1 | D-2 | D-3 |
| Steam Deactivation: Temperature (°C.) | 765 | 690 | 715 | 740 | 7765 | 690 | 715 | 740 |
| Wt. % Conversion: | 61.9 | 74.5 | 72.1 | 67.8 | 62.9 | 70.5 | 70.7 | 66.4 |
| Wt. % Gasoline: | 46.5 | 52.2 | 52.5 | 50.2 | 47.6 | 51.0 | 51.3 | 49.5 |
| $C_3$ Olefin/$C_3$ Paraffin Ratio: | 2.84 | 1.47 | 1.96 | 2.10 | 3.79 | 1.70 | 2.08 | 2.54 |
| $C_4$ Olefin/$C_3$ Paraffin Ratio: | 0.55 | 0.30 | 0.38 | 0.42 | 0.66 | 0.33 | 0.40 | 0.47 |
| $C_6$ Ratios, Olefin/paraffin: | 0.257 | 0.075 | 0.107 | 0.152 | 0.265 | 0.119 | 0.099 | 0.170 |
| $C_6$ Branched/Linear[2] Olefin: | 0.64 | 0.88 | 1.11 | 0.49 | 0.92 | 0.87 | 0.96 | 0.81 |
| $C_6$ Iso/Normal[3] Paraffin: | 13.6 | 13.0 | 13.7 | 13.2 | 17.1 | 15.3 | 15.8 | 15.1 |

1 Run Temperature was 850° F. instead the 900° F. of ASTM test method D-3907.
2 $C_6$ Branched olefins measured were 2-methyl-2-pentene and 2-methyl-1-pentene. $C_6$ linear olefins measured were 1-hexene, trans-2-hexene, cis-2-hexene and trans-3-hexene.
3 $C_6$ iso-paraffins measured were 2-methyl pentane, 3-methyl pentane and 2,2-dimethyl butane. $C_6$ normal paraffin measured was n-hexane.

The above data demonstrate that catalysts containing SAPOs retain their selective nature after hydrothermal treatment. The branched to linear olefin weight ratio and the iso to normal paraffin weight ratios were higher at comparable conversions and gasoline yield for the catalysts containing SAPO-11 as compared to catalysts containing no SAPO-11, thus indicating higher octane products. Thus, the advantages derived from use of SAPOs is not significantly affected by hydrothermal deactivation conditions.

EXAMPLE 6

Two catalysts were prepared wherein reference Catalyst J contained a steam stabilized Y zeolite denominated as LZ-10 and a Catalyst K contained LZ-10 and SAPO-11. LZ-10 was prepared according to U.K. Pat. 2,014,970 and was then ammonium exchanged.

Catalyst J was prepared by preparing a mixture containing 18% by weight LZ-10, 62% by weight kaolin clay and 20% by weight silica in enough water to form an extrudable mass. This mixture had a paste consistency and was mulled, extruded and calcined at 500° C. for 16 hours in air. The extrudates were crushed and sized so as to pass through a 60 mesh screen (U.S. Standard) and not pass through a 200 mesh (U.S. Standard) screen.

Catalyst K was prepared as was Catalyst J, except that the initial mixture was 18% by weight LZ-10, 6% by weight SAPO-11, 56% by weight kaolin clay and 20% by weight silica.

The two catalysts were evaluated according to ASTM test method D-3907, except the run temperature was 866° F. All products are given as weight ratios. The results were as follows:

|  | Catalyst | |
|---|---|---|
|  | Catalyst J | Catalyst K |
| Wt. % Conversion | 70.2 | 69.1 |
| Wt. % Gasoline | 50.7 | 50.1 |
| $C_3$ Olefin/$C_3$ Paraffin | 1.76 | 1.86 |
| $C_4$ Olefin/$C_4$ paraffin | .402 | .382 |
| $C_4$ Iso/Normal paraffin | 4.12 | 4.64 |

-continued

| | Catalyst | |
|---|---|---|
| | Catalyst J | Catalyst K |
| Wt. % Alkylate | 10.9 | 10.9 |
| C$_6$ olefin/C$_6$ paraffin | .154 | .166 |
| C$_6$ iso/normal paraffin[1] | 13.4 | 15.4 |
| C$_6$ branched/linear olefin[2] | 1.18 | 1.67 |
| C$_7$ olefin/paraffin | .0769 | .086 |
| C$_7$ iso/normal paraffin[2] | 16.9 | 18.6 |
| C$_7$ branched/linear olefin[2] | .739 | .799 |

[1] C$_6$ isoparaffins measured were 2-methyl pentane, 3-methyl pentane and 2,2 dimethyl butane. C$_6$ normal paraffin measured was n-hexane. C$_6$ branched olefins measured were 3-methyl-1-pentene, 4-methyl-1-pentene, 2-methyl-1-pentene, 2-methyl-2-pentene and trans-3-methyl-2-pentene. C$_6$ linear olefins measured were 1-hexene, trans-3-hexene, cis-2-hexene and trans-2-hexene.

[2] C$_7$ iso-paraffins measured were 3-methyl hexane, 2-methyl hexane and 2,4-dimethyl pentane. C$_7$ normal paraffin measured was n-heptane. C$_7$ branched olefins measured were determined by measuring all C$_7$ olefins and subtracting from that factor the C$_7$ linear olefns measured. C$_7$ linear olefins measured were 1-heptene, cis-2-heptene, trans-2-heptene, cis-3-heptene and trans-3-heptene.

The above data demonstrate that Catalyst K, according to this invention, provided a gasoline product having higher iso/normal paraffin and branched/linear olefin ratios in the C$_6$ and C$_7$ hydrocarbons which are indicative of higher octane products and such were formed at comparable gasoline yield and conversion.

COMPARATIVE EXAMPLE 7

Two catalysts were prepared wherein reference Catalyst L contained LZ-210 and comparative Catalyst M contained AlPO$_4$-5 and Catalyst L. AlPO$_4$-5 was prepared according to U.S. Pat. No. 4,310,440.

Catalyst L was prepared by forming a mixture of 15% by weight LZ-210 (SiO$_2$ to Al$_2$O$_3$ ratio of 9.0), 63% by weight kaolin clay, 18% by weight alumina and 4% by weight silica. The catalyst was extruded and treated similar to the catalysts of example 3 except that the steam deactivation was at 765° C.

Catalyst M was prepared by blending 10% by weight of a calcined AlPO$_4$-5 with 90% by weight of Catalyst L.

Catalyst L and Catalyst M were evaluated by ASTM test method D-3907. The olefin/paraffin and iso/normal paraffin ratios are given as weight ratios. The results were as follows:

| | Catalyst | |
|---|---|---|
| | Catalyst L | Catalyst M |
| Wt. % Conversion | 69.9 | 67.1 |
| Wt. % Gasoline | 50.8 | 48.6 |
| C$_3$ Olefin/Paraffin | 2.87 | 2.68 |
| C$_4$ Olefin/Paraffin | 0.59 | 0.57 |
| C$_4$ Iso/Normal Paraffin | 4.36 | 4.36 |

The above data demonstrate that AlPO$_4$-5, having a similar framework to SAPO-5, does not provide the benefits observed when SAPO-5, having SiO$_2$ tetrahedral framework components, is employed in conjunction with a traditional cracking catalyst.

COMPARATIVE EXAMPLE 8

Three catalysts (N, O and P) were prepared. Catalysts N and P are comparative catalysts and catalyst O is a catalyst prepared according to the instant invention. The catalysts were formed according to the procedure employed in example 1 except that Catalysts O and P employed 54 weight percent kaolin clay and the zeolite and SAPO components were as follows. Catalyst N contained 18 weight percent of an LZ-210 having a SiO$^2$ to Al$_2$O$_3$ ratio of 9.0. Catalyst O contained 18 weight percent of the LZ-210 employed in Catalyst N and 6 weight percent of SAPO-11. Catalyst P contained 18 weight percent of the LZ-210 employed in Catalyst N and 6 weight percent of SAPO-34.

Catalysts N, O and P were steam deactivated in 100 percent steam for 2 hours and at 740° C., 740° C. and 760° C., respectively, and evaluated according to ASTM test method D-3907. The results of this evaluation were as follows:

| | Catalyst | | |
|---|---|---|---|
| | Catalyst N | Catalyst O | Catalyst P |
| Wt. % Conversion | 72.7 | 71.5 | 72.0 |
| Wt. % Gasoline | 52.7 | 51.2 | 47.7 |
| Wt. Gas + C$_4$s | 15.6 | 15.8 | 19.5 |
| Wt. % Coke | 4.05 | 4.27 | — |

The above results demonstrate the reduced gasoline yield of catalysts containing SAPO-34. SAPO-34 is not characterized by an adsorption of isobutane of at least 2 percent by weight at a pressure of 500 torr and a temperature of 20° C.

EXAMPLE 9

Two catalysts were prepared for evaluation according to ASTM test method D-3907. The two catalysts were prepared using the silicoaluminophosphate molecular sieve SAPO-5 and the zeolite LZ-210 (SiO$_2$ to Al$_2$O$_3$ ratio of 9.0).

After preparation of SAPO-5 the material was steam deactivated in 100 percent steam at 760° C. for 2 hours to simulate the effect of actual use in a cracking process. The LZ-210 component was then rare earth exchanged with a mixture of rare earth chlorides, as described in example 4, to give a rare earth exohanged LZ-210 containing 9.9 weight percent rare earth, expressed as the oxide.

A matrix for the SAPO-5 and LZ-210 was prepared by mixing 90 percent by weight of a silica/alumina, sold by the Davison Division of W.R. Grace under the trade designation MS13/110, and 10 percent by weight of a microcrystalline cellulose extrusion aid. The mixture was extruded in the form of 1/16 inch pellets and dried in air at 110° C. for about 16 hours and then steam deactivated in 100 percent steam at 760° C. for 2 hours. The steam deactivated material was then crushed and sized to 60 to 200 mesh (U.S. Standard).

The SAPO-5 and LZ-210 catalysts were each prepared by mixing 15 percent by weight of the selected material with 85 percent by weight of the matrix. The LZ-210 was steam deactivated in 100% steam at 760° C. for 2 hours prior to use in the preparation of the catalyst. The final catalyst mixtures were then calcined at 590° C. in air for 3 hours. Each catalyst was evaluated for conversion according to ASTM test method D-3907. The results of the evaluation were as follows:

| | Catalyst | |
|---|---|---|
| | SAPO-5 | LZ-210 |
| Wt. % Conversion | 57.7 | 57.2 |
| Wt. % Gasoline | 37.2 | 41.4 |
| Wt. % Gas | 6.6 | 5.5 |
| Wt. % Coke | 3.9 | 3.1 |
| Wt.% C$_4$s | 10.0 | 7.33 |

The above results demonstrate the individual activity of SAPO-5 and LZ-210 as cracking catalysts. Although LZ-210 showed a higher Wt. % Gasoline, SAPO-5 formed more gas products and C₄ products under the conditions of ASTM test method D-3907. As observable from the above examples according to the instant invention, the use of a catalyst comprising a traditional cracking catalyst and a SAPO provide products having different components than the products obtained by use of a SAPO or LZ-210 separately.

EXAMPLE 10

A catalyst is prepared according to the procedure described in example 1 for Catalyst B, except MgAPSO-5 is employed in place of SAPO-5. The catalyst is tested according to ASTM test method D-3907 and gives products having a product distribution different from the product distribution obtained by use of catalyst A.

EXAMPLE 11

Two catalysts are prepared according to the procedure described in Example 1 for catalyst B, except that one catalyst contains MnAPSO-34 in place of SAPO-5 and one catalyst contains MnAPSO-11. MnAPSO-11 is characterized by an isobutane adsorption as described according to this invention, whereas MnAPSO-34 is not so characterized. Evaluation by ASTM test method D-3907 shows the catalyst containing MnAPSO-11 has to the catalyst containing MnAPSO-34 cracking activity to gasoline products superior to the catalyst containing MnAPSO-34.

EXAMPLE 12

Two catalysts are prepared according to the procedure described in example 1 for catalyst B except that one catalyst contained MnAPO-11 and one catalyst contained MgAPO-5 in place of SAPO-5. Evaluation by ASTM test method D-3907 provides products different from the product distribution obtained using Catalyst A of Example 1.

What is claimed is:

1. A catalytic cracking process for cracking a hydrocarbon feedstock to produce lower boiling hydrocarbons, comprising contacting said hydrocarbon feedstock at catalytic cracking conditions effective for converting said hydrocarbon feedstock, with a conversion catalyst comprising an amount of at least one non-zeolitic molecular sieve (NZ-MS) effective to increase the gasoline octance number of the products without substantially increasing the loss in gasoline yield and feedstock conversion, said non-zeolitic molecular sieve being selected from the group consisting of SAPOs, ELAPSOs, MeAPOs, TiAPOs, FeAPOs and FCAPOs and being characterized in its calcined form by an adsorption of isobutane of at least 2 percent by weight at a partial pressure of 500 torr and a temperature of 20° C.

2. The process of claim 1 wherein said non-zeolitic molecular sieve is further characterized in its calcined form by an adsorption of triethylamine of at least 5 percent by weight at a pressure of 2.6 torr and a temperature of 22° C.

3. A process of claim 1 wherein said catalyst contains an amount of at least one zeolitic aluminosilicate having cracking activity in a weight ratio between about 1:10 and about 500:1 of said zeolitic aluminosilicate to said non-zeolitic molecular sieve and from 0 and about 99 weight percent of at least one inorganic oxide matrix component, based on the total weight of said catalyst.

4. The process of claim 3 wherein said non-zeolitic molecular sieve is further characterized in its calcined form by an adsorption of triethylamine of less than 5 percent by weight at a pressure of 2.6 torr and a temperature of 22° C.

5. The process of claim 3 wherein the weight ratio of zeolitic aluminosilicate to said non-zeolitic molecular sieve is between about 1:2 and about 50:1.

6. The process of claim 5 wherein the weight ratio of zeolitic aluminosilicate to said non-zeolitic molecular sieve is between about 1:1 and about 20:1.

7. The process of claim 3 wherein inorganic oxide component is present in an amount between about 5 and about 95 percent by weight, based on the total weight of said catalyst.

8. The process according to claim 3 wherein said zeolite component of the conversion catalyst contains cations selected from the group consisting of ammonium, Group IIA, Group IIIA, Groups IIIB to VIIB, cerium, lanthanum, praseodymium, neodymium, promethium, samarium, europium, gadolinium, terbium, dysprosium holmium, erbium, thulium, ytterbium, lutetium and mixtures thereof.

9. A process of claim 1 wherein said non-zeolithic molecular sieve has been exchanged with a hydrogen-forming cation species so that it has at least part of the cations as hydrogen-forming species.

10. The process of claim 9 wherein said hydrogen-forming species of the cations of the said non-zeolitic molecular sieves is NH₄+ or H+.

11. The cracking process of claim 1 wherein the process is carried out by contacting a hydrocarbon feedstock boiling between 420° F. and about 1800° F. with the conversion catalyst at a temperature between about 400° F. and about 1600° F., at a pressure between about 14/7 pisg to about 100 psig.

12. The process of claim 8 wherein said zeolite component of said conversion catalyst contains between about 0.1 percent and about 20 weight percent of at least one multivalent cation.

13. The process of claim 7 wherein said inorganic oxide matrix component is selected from the group consisting of clays, silicas, aluminas, silica-aluminas, silica-zirconias, silica-magnesia, alumina-borias, alumina-titanias and mixtures thereof.

14. The process of claim 1 or 3 wherein said non-zeolitic molecular sieve is selected from the group consisting of CoAPSOs, FeAPSOs, MgAPSOs, MnAPSOs, TiAPSOs, ZnAPSOs, COMgAPSOS, CoMnMgAPSOs, MeAPos, TiAPOs, FeAPOs, FCAPOs and mixture thereof.

15. The process of claim 1 or 3 wherein said non-zeolitic molecular sieve is selected from the group consisting of CoAPSOs, FeAPSOs, MgAPSOs, MnAPSOs, TiAPSOs, ZnAPSOs, CoMgAPSOs, CoMnMgAPSOs and mixtures thereof.

16. The process of claim 1 or 3 wherein said non-zeolitic molecular sieve is selected from the group consisting of ELAPSO-5, ELAPSO-11, ELAPSO-31, ELAPSO-37, ELAPSO-40, ELAPSO-41, and mixtures thereof.

17. The process of claim 16 wherein said non-zeolitic molecular sieve is selected from the group consisting of CoAPSO-5, CoAPSO-11, CoAPSO-31, CoApSO-37, CoAPSO-40, CoAPSO-41, FeAPSO-5, FeAPSO-11, FeAPSO-31, FeAPSO-37, FeAPSO-40, FeAPSO-41, MgAPSO-5, MgAPSO-11, MgAPSO-31, MgAPSO-37, MgAPSO-40, MgAPSO-41, MnAPSO-5, MnAPSO-11, MnAPSO-31, MnAPSO-37, MnAPSO-40, MnAPSO-41, TiAPSO-5, TiAPSO-11, TiAPSO-31, TiAPSO-37, TiAPSO-40, TiAPSO-41, ZnAPSO-5, ZnAPSO-11, ZnAPSO-31, ZnAPSO-37, ZnAPSO-40, ZnPASO-41, CoMgAPSO-5, CoMgAPSAO-11, CoMgAPSO-31, CoMgAPSO-37, CoMgAPSO-40, CoMgAPSO-41, CoMnMgAPSO-5, CoMnMgAPSO-11, CoMnMgAPSO-31, CoMnMgAPSO-37, CoMnMgAPSO-40, CoMnMgAPSO-41 and mixtures thereof.

18. The process of claim 1 or 3 wherein said non-zeolitic molecular sieves is selected from the group consisting of MeAPO-5, MeAPO-11, MeAPO-31, MeAPO-37, MeAPO-40, MeAPO-41, TiAPO-5, TiAPO-11, TiAPO-31, TiAPO-37, TiAPO-40, TiAPO-41, FeAPO-5, FeAPO-11, FeAPO-31, FeAPO-37, FeAPO-40, FeAPO-41, FCAPO-5, FCAPO-11, FCAPO-31, FCAPO-37, FCAPO-40, FCAPO-41 and mixtures thereof.

19. The process of claim 18 wherein "Me" is selected from the group consisting of cobalt, magnesium, manganese, and mixtures thereof.

20. The process of claim 18 wherein "Me" is selected from the group consisting of magnesium, manganese and mixtures thereof.

21. The process of claim 1 wherein said hydrocarbon feedstock is selected from the group consisting of distillate gas oils, atmospheric resids, vacuum resids, syncrudes, pulverized coal and mixtures thereof.

22. The process of claim 3 wherein said zeolitic aluminosilicate is selected from the group consisting of zeolite Y, zeolite X, zeolite beta, zeolite KZ-20, LZ-210, LZ-10, ZSM zeolites and mixtures thereof.

23. The process of claim 4 wherein said zeolitic aluminosilicate is selected from the group consisting of zeolite Y, zeolite X, zeolite beta, zeolite KZ-20, LZ-210, LZ-10, ZSM zeolites and mixtures thereof.

24. The process of claim 22 wherein said ZSM zeolite is selected from the group consisting of ZSM-5, ZSM-11, ZSM-12, ZSM-23, ZSM-35, ZSM-38 AND ZSM-48.

25. The process of claim 23 wherein said ZSM zeolite is selected from the group consisting of ZSM-5, ZSM-11, ZSM-12, ZSM-23, ZSM-35, ZSM-38 AND ZSM-48.

26. The catalytic cracking process for cracking a hydrocarbon feedstock to produce lower boiling hydrocarbons comprising contacting said feedstock, at catalytic cracking conditions effective for converting said feedstock, with a catalyst prepared by a process comprising the following steps:
(a) forming a mixture of at least one zeolitic aluminosilicate and at least one non-zeolitic molecular sieve (NZ-MS) at a weight ratio of between about 1:10 and about 500:1, respectively, said NZ-MS being selected from the group consisting of ELAPSO, MeAPO, TiAPO, FeAPO and FCAPO and being characterized in its calcined form by an adsorption of isobutane of at least 2 percent by weight at a pressure of 500 torr and a temperature of 20° C.;
(b) forming a mixture of the product of step (a) and at least one inorganic oxide matrix component to form a catalyst.

27. A catalytic cracking process for cracking a hydrocarbon feedstock to produce lower boiling hydrocarbons comprising contacting said feedstock, at catalytic cracking conditions effective for converting said feedstock, with a catalyst prepared by a process comprising the following steps:
(a) forming a mixture of at least one inorganic oxide matrix component and at least one zeolitic aluminosilicate;
(b) forming a mixture of at least one inorganic oxide matrix component and at least one non-zeolitic molecular sieve (NZ-MS), said NZ-MS being selected from the group consisting of ELAPSO, MeAPO, TiAPO, FeAPO and FCAPO and being characterized in its calcined form by an adsorption of isobutane of at least 2 percent by weight at a pressure of 500 torr and a temperature of 20° C.; and
(c) forming a mixture of the products of steps (a) and (b) to form a catalyst having a weight ratio of zeolitic aluminosilicate to NZ-MS between about 1:10 and about 500:1.

28. A catalytic cracking process for cracking a hydrocarbon feedstock to produce lower boiling hydrocarbons comprising contacting said feedstock, at catalytic cracking conditions effective for converting said feedstock with a catalyst comprising at least one zeolitic aluminosilicate having cracking activity and at least one NZ-MS selected from the group consisting of ELAPSO, MeAPO, TiAPO, FeAPO and FCAPO and characterized in its calcined form by an adsorption of isobutane of at least 2 percent by weight at a pressure of 500 torr and a temperature of 20° C. wherein, the weight ratio between said aluminosilicate and NZ-MS is between about 1:10 and about 500:1.

29. The process of claim 28 wherein said NZ-MS is further characterized in its calcined form by an adsorption of triethylamine of less than 5 percent by weight at a pressure of 2.6 torr and a temperature of 22° C.

30. The process of claim 28 wherein said NZ-MS is further characterized in its calcined form by an adsorption of triethylamine of at least 5 percent by weight at a pressure of 2.6 torr and a temperature of 22° C.

31. The process of claim 28 wherein said zeolitic aluminosilicate is selected from the group consisting of zeolite Y, zeolite X, zeolite beta, zeolite KZ-20, faujasite, LZ-210, LZ-10, ZSM zeolites and mixtures thereof.

32. The process of claim 28 wherein said catalyst contains from 1 to 99 percent by weight of at least one inorganic oxide matrix component selected from the group consisting of clays, silicas, aluminas, silica-aluminas, silica-zirconias, silica-magnesia, alumina-borias, alumina-titanias and mixtures thereof.

33. The process of claim 28 wherein said zeolitic aluminosilicate is selected from the group consisting of Y zeolite, LZ-210, LZ-10 and mixtures thereof and said NZ-MS is selected from the group consisting of ELAPSO-5, ELAPSO-11, ELAPSO-31, ELAPSO-37, ELAPSO-40, ELAPSO-41 and mixtures thereof.

34. The process of claim 28 wherein said zeolitic aluminosilicate contains between about 0.1 and about 20 percent by weight of a cation selected from the group consisting of ammonium, Group IIA, Group IIIA, Groups IIIB to VIIB, rare metals and mixtures thereof.

35. The process of claim 34 wherein said rare earth metal is selected from the group consisting of cerium, lanthanum, praseodymium, neodymium, promethium, samarium, europium, gadolinium, terbium, dysprosium, holmium, erbium, thulium, ytterbium, lutetium and mixtures thereof.

* * * * *